(12) United States Patent
Yi et al.

(10) Patent No.: US 12,009,475 B2
(45) Date of Patent: Jun. 11, 2024

(54) ALL-SOLID-STATE BATTERY INCLUDING A SOLID ELECTROLYTE AND METHODS OF MAKING THEREOF

(71) Applicants: The Regents of the University of California, Oakland, CA (US); MONTANA STATE UNIVERSITY, Bozeman, MT (US)

(72) Inventors: Eongyu Yi, Richmond, CA (US); Marca Doeff, Hayward, CA (US); Guoying Chen, Oakland, CA (US); Stephen Sofie, Manhattan, MT (US)

(73) Assignees: The Regents of the University of California, Oakland, CA (US); Montana State University, Bozeman, MT (US)

( * ) Notice: Subject to any disclaimer, the term of this patent is extended or adjusted under 35 U.S.C. 154(b) by 474 days.

(21) Appl. No.: 17/095,483

(22) Filed: Nov. 11, 2020

(65) Prior Publication Data
US 2021/0151790 A1   May 20, 2021

Related U.S. Application Data

(60) Provisional application No. 62/936,737, filed on Nov. 18, 2019.

(51) Int. Cl.
*H01M 10/0562* (2010.01)
*H01M 4/38* (2006.01)
(Continued)

(52) U.S. Cl.
CPC ....... *H01M 10/0562* (2013.01); *H01M 4/381* (2013.01); *H01M 4/382* (2013.01); *H01M 4/505* (2013.01); *H01M 4/525* (2013.01);
*H01M 4/5825* (2013.01); *H01M 4/62* (2013.01); *H01M 4/625* (2013.01); *H01M 4/1391* (2013.01); *H01M 2300/0045* (2013.01); *H01M 2300/0068* (2013.01); *H01M 2300/0077* (2013.01);
(Continued)

(58) Field of Classification Search
None
See application file for complete search history.

(56) References Cited

U.S. PATENT DOCUMENTS

2017/0040643 A1* 2/2017 Dolle .................. H01M 4/5825

OTHER PUBLICATIONS

Yi et al., "All-Solid-State Batteries Using Rationally Designed Garnet Electrolyte Frameworks," Applied Energy Materials, vol. 3, pp. 170-175, (Jan. 2, 2020). ok.
(Continued)

*Primary Examiner* — Laura Weiner

(57) ABSTRACT

This disclosure provides systems, methods, and apparatus related to an all-solid-state battery including a solid electrolyte. In one aspect, a device includes a first layer of an ionically conducting oxide, a second layer of the ionically conducting oxide disposed on the first layer, and an anode disposed on the second layer of the ionically conducting oxide. The first layer defines through pores having a tortuosity of about 1. The first layer includes transition metal oxide particles and an ionically conducting solid disposed in the through pores. The transition metal oxide particles are a cathode. The first layer and the ionically conducting solid are an electrolyte. The second layer does not define any through pores. The second layer is a separator.

13 Claims, 24 Drawing Sheets

(51) Int. Cl.
    *H01M 4/505*     (2010.01)
    *H01M 4/525*     (2010.01)
    *H01M 4/58*     (2010.01)
    *H01M 4/62*     (2006.01)
    *H01M 4/1391*     (2010.01)

(52) U.S. Cl.
    CPC ............... *H01M 2300/0091* (2013.01); *H01M 2300/0094* (2013.01)

(56) References Cited

OTHER PUBLICATIONS

Shen et al., "Scalable Freeze-Tape-Casting Fabrication and Pore Structure ," Analysis of 3D Llzo Solid-State Electrolytes, Applied Materials, vol. 12, pp. 3494-3501, (2020). ok.

Zhu et al., "Organic Ionic Plastic Crystals as Solid-State Electrolytes," Trends in Chemistry, vol. 1, No. 1, pp. 126-140, (Apr. 2019). ok.

Thangadurai et al., "Garnet-type solid-state fast Li ion conductors for Li batteries: critical review," Chemical Society Reviews, vol. 43, pp. 4714-4727, (Jan. 13, 2014). ok.

Sofie, "Fabrication of Functionally Graded and Aligned Porosity in Thin Ceramic Substrates With the Novel Freeze-Tape-Casting Process," Journal of the American Ceramic Society, vol. 90, pp. 2024-2031, (Feb. 13, 2007). ok.

Shen et al., "Oriented porous Llzo 3D structures obtained by freeze casting for battery applications," Journal of Materials Chemistry A, vol. 7, pp. 20861-20870, (Aug. 19, 2019). ok.

Yi et al., "Flame made nanoparticles permit processing of dense, flexible, Li+ conducting ceramic electrolyte thin films of cubic-Li7La3Zr2O12 (c-LLZO)," Journal of Materials Chemistry A, vol. 4, pp. 12947-12954 (Jul. 31, 2016). ok.

Wu et al., "Garnet-Type Fast Li-Ion Conductors with High Ionic Conductivities for All-Solid-State Batteries," Applied Materials and Interfaces, vol. 9, pp. 12461-12468, (Mar. 23, 2017). ok.

Jiang et al., "Perovskite Membranes with Vertically Aligned Microchannels for All-Solid-State Lithium Batteries," Advanced Energy Materials, vol. 8, pp. 1801433 (1-7), (2018).

Samson et al., "A bird's-eye view of Li-stuffed garnet-type Li7La3Zr2O12 ceramic electrolytes for advanced all-solid-state Li batteries," Energy and Environmental Science, vol. 12, pp. 2957-2975, (Aug. 12, 2109). ok.

Hitz et al., "High-rate lithium cycling in a scalable trilayer Li-garnet-electrolyte architecture," Materials Today, vol. 22 , pp. 50-57, (Jan./Feb. 2019). ok.

Yi et al., "Key parameters governing the densification of cubic-Li7La3Zr2O12 Lip conductors," Journal of Power Sources, vol. 352 pp. 156-164, (Mar. 31, 2017). ok.

* cited by examiner

ALL-SOLID-STATE BATTERY INCLUDING A SOLID ELECTROLYTE AND METHODS OF MAKING THEREOF

RELATED APPLICATIONS

This application claims priority to U.S. Provisional Patent Application No. 62/936,737, filed Nov. 18, 2019, which is herein incorporated by reference.

STATEMENT OF GOVERNMENT SUPPORT

This invention was made with government support under Contract No. DE-AC02-05CH11231 awarded by the U.S. Department of Energy. The government has certain rights in this invention.

TECHNICAL FIELD

This disclosure relates generally to batteries and more particularly to all-solid-state batteries.

BACKGROUND

All-solid-state batteries (ASSBs) potentially offer higher energy density, longer cycle life, and better inherent safety than state-of-the-art lithium ion batteries (LIBs). However, successful fabrication of ASSBs with ceramic electrolytes has primarily been restricted to small-scale thin film devices due to processing difficulties and interfacial challenges.

SUMMARY

One innovative aspect of the subject matter described in this disclosure can be implemented in a device including a first layer of an ionically conducting oxide, a second layer of the ionically conducting oxide disposed on the first layer, and an anode disposed on the second layer of the ionically conducting oxide. The first layer defines through pores having a tortuosity of about 1. The first layer includes transition metal oxide particles and an ionically conducting solid disposed in the through pores. The transition metal oxide particles are a cathode. The first layer and the ionically conducting solid are an electrolyte. The second layer does not define any through pores. The second layer is a separator.

Another innovative aspect of the subject matter described in this disclosure can be implemented in a method including fabricating a first layer of an ionically conducting oxide. The first layer defines through pores having a tortuosity of about 1. A second layer of the ionically conducting oxide is fabricated. The second layer does not define any thorough pores. The first layer and the second layer are sintered with the first layer being in contact with the second layer. Transition metal oxide particles are deposited on walls of the through pores in the first layer. An ionically conducting solid is infiltrated into the through pores in the first layer. An anode is deposited on the second layer.

An example of specific embodiment, a bulk-type all-solid-state battery with composite positive electrodes, using Al-substituted $Li_7La_3Zr_2O_{12}$ (LLZO) as the solid electrolyte, also is described herein. The devices incorporate bilayers composed of dense LLZO membranes and porous LLZO scaffolds infiltrated with $LiNi_{0.6}Mn_{0.2}Co_{0.2}O_2$ (NMC-622) and other components as positive electrodes, combined with lithium foil anodes. The porous scaffolds were prepared using a freeze tape casting (FTC) method. The unidirectional pores of the scaffold facilitate infiltration of cathode components and shorten lithium ion diffusion path lengths, while the addition of a soft ionically conductive solid to the scaffold ensures good contact among the components as the cells are cycled.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

The terms "about" or "approximate" and the like are synonymous and are used to indicate that the value modified by the term has an understood range associated with it, where the range can be ±20%, ±15%, ±10%, ±5%, or ±1%. The terms "substantially" and the like are used to indicate that a value is close to a targeted value, where close can mean, for example, the value is within 80% of the targeted value, within 85% of the targeted value, within 90% of the targeted value, within 95% of the targeted value, or within 99% of the targeted value.

In some embodiments, an all-solid-state battery comprises a bilayer of ionically conducting oxide. In some embodiments, an all-solid-state battery does not include a liquid or a liquid electrolyte.

Figure 5:
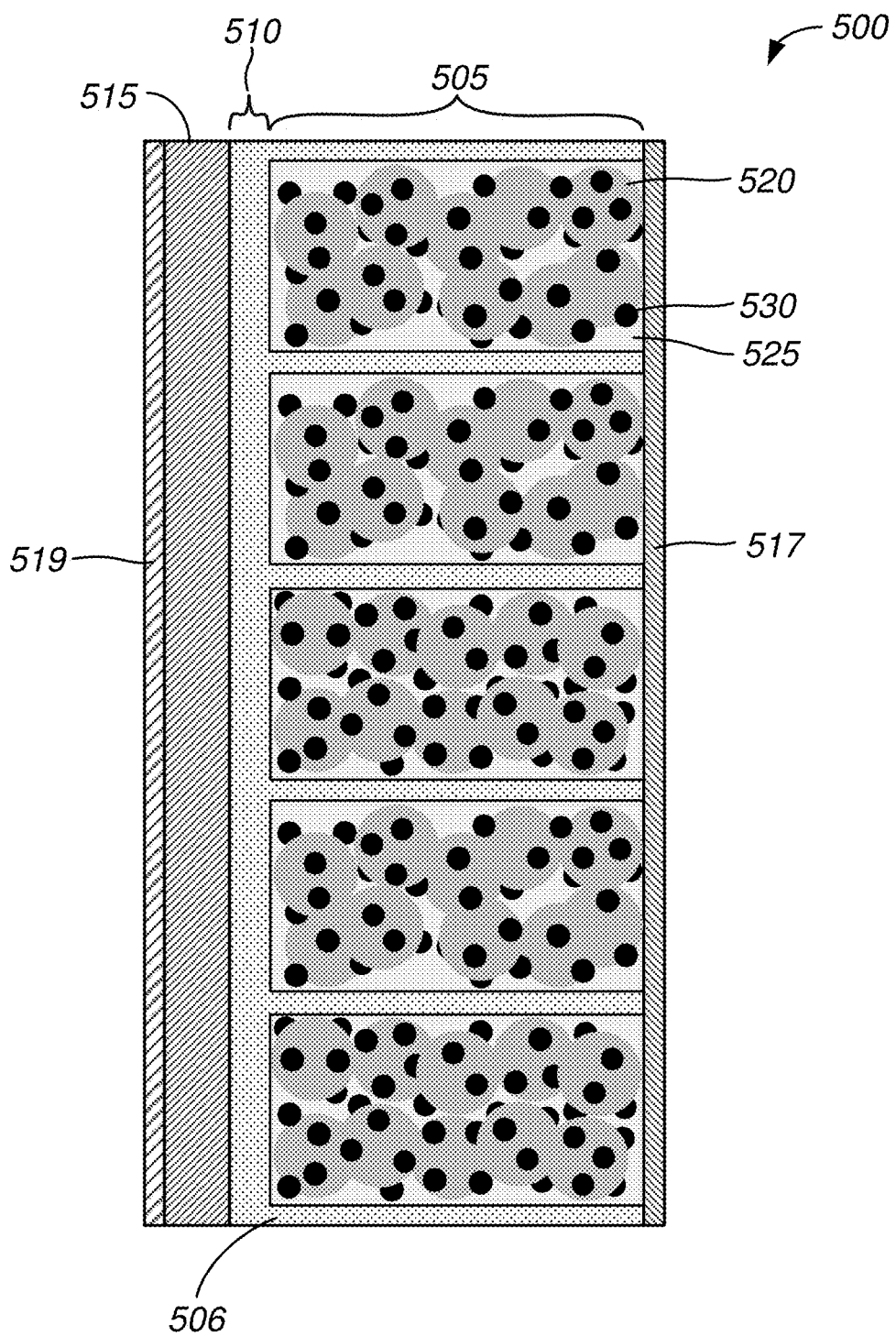
FIG. 5 shows an example of a schematic illustration of an all-solid-state battery.

FIG. 5 shows an example of a schematic illustration of an all-solid-state battery. As shown in FIG. 5, an all-solid-state battery 500 comprises a first layer of an ionically conducting oxide 505, a second layer of the ionically conducting oxide 510 disposed on the first layer 505, and an anode disposed 515 on the second layer of the ionically conducting oxide 510. In some embodiments, the all-solid-state battery 500 further comprises a first current collector 517 disposed on the first layer 505. In some embodiments, the all-solid-state battery 500 further comprises a second current collector 519 disposed on the anode 515.

In some embodiments, the ionically conducting oxide of the first layer 505 and the second layer 510 is selected from a group consisting of $Li_7La_3Zr_2O_{12}$ and derivatives, $LiTi_2(PO_4)_3$ and derivatives, and $LiZr_2(PO_4)_3$ and derivatives. The first layer of the ionically conducting oxide 505 defines through pores 507. A through pore is a pore that creates a path from a first side of the first layer to a second side of the first layer. In some embodiments, the through pores 507 have a tortuosity of about one (1). In two-dimensions, a simple method to estimate tortuosity is the arc-chord ratio.

The arc-chord ratio is the ratio of length of the curve (C) to the distance between the ends of the curve (L); i.e., tortuosity=C/L. The tortuosity or arc-chord ratio is one (1) for a straight line and infinite for a circle. A through pore 507 having a tortuosity of one (1) is a pore that defines a straight line between the first side of the first layer 505 to the second side of the first layer 505.

In some embodiments, the through pores 507 have cross-sectional dimensions of about 10 microns to 50 microns. The through pores 507 may have a round, an oval, or a slit-like cross-section. In some embodiments, the through pores 507 have an effective diameter of about 10 microns to 50 microns. Effective diameter is a measurement that takes into account that the through pores 507 may not have a circular cross-section.

In some embodiments, the first layer is about 50 microns to 500 microns thick, about 50 microns to 300 microns thick, or about 120 to 130 microns thick. The first layer of the ionically conducting oxide 505 includes materials disposed in the through pores, including lithium transition metal oxide particles 520 and an ionically conducting solid 525. The lithium transition metal oxide particles 520 serve as a cathode in the all-solid-state battery 500. The ionically conducting solid 525 serves as an electrolyte in the all-solid-state battery 500. In some embodiments, an electron conducting material 530 is disposed in the through pores. In some embodiments, the electron conducting material 530 is disposed on surfaces of the lithium transition metal oxide particles.

In some embodiments, the lithium transition metal oxide particles 520 are selected from a group consisting $LiNi_xMn_yCo_zO_2$ ($0 \leq x \leq 1$, $0 \leq y \leq 1$, $0 \leq z \leq 1$, x+y+z=1), $LiMPO_4$ (M=Fe, Ni, Co, Mn and combinations thereof), $LiMn_2O_4$ and variants, $LiMn_{1.5}Ni_{0.5}O_4$ and variants, and combinations thereof. $LiNi_xMn_yCo_zO_2$ ($0 \leq x \leq 1$, $0 \leq y \leq 1$, $0 \leq z \leq 1$, x+y+z=1) is a layered cathode. $LiMPO_4$ (M=Fe, Ni, Co, Mn) is an olivine cathode. $LiMn_2O_4$ and $LiMn_{1.5}Ni_{0.5}O_4$ are spinel cathodes. In some embodiments, the lithium transition metal oxide particles 520 have dimensions of about 0.2 microns to 20 microns, or about 1 micron to 10 microns. In some embodiments, the lithium transition metal oxide particles 520 have diameters of about 0.2 microns to 20 microns, or about 1 micron to 10 microns. In some embodiments, a volume percent of the lithium transition metal oxide particles 520 in the through pores is about 50% to 80%, or about 50% to 70%. The remaining volume percent not occupied by lithium transition metal oxide particles 520 is occupied by the ionically conducting solid 525, the electron conducting material 530, or other materials.

In some embodiments, instead of lithium transition metal oxide particles, the cathode comprises a different electrode active material. In some embodiments, instead of lithium transition metal oxide particles, the cathode comprises sulfur particles. In some embodiments, instead of lithium transition metal oxide particles, the cathode comprises a redox active organic material (e.g., a quinone). In some embodiments, when the cathode comprises sulfur particles or an organic material, the through pores have cross-sectional dimensions of less than about 10 microns.

The ionically conducting solid 525, in addition to the ionically conductive oxide of the first layer 505, serves as a solid electrolyte in the all-solid-state battery 500. In some embodiments, the ionically conducting solid 525 is a hard solid. In some embodiments, the ionically conducting solid 525 is a soft solid. In some embodiments, the ionically conducting solid 525 can be infiltrated (e.g., melt-infiltrated or solution-infiltrated) into the through pores of the first layer of the ionically conductive oxide 505. In some embodiments, the ionically conducting solid 525 promotes contact and ionic and electrical conduction between the first layer 505 and the materials disposed in the through pores of the first layer 505 (e.g., the lithium transition metal oxide particles 520 and the conductive material 530).

In some embodiments, the ionically conducting solid 525 comprises a polymer salt complex. In some embodiments, the ionically conducting solid 525 comprises polycaprolactone complexed with LiTFSI, LiBOB, or the other lithium salts described herein.

In some embodiments, the ionically conducting solid 525 comprises an argyrodite type solid electrolyte $Li_6PS_5X$ (X=Cl, Br, I).

In some embodiments, the ionically conducting solid 525 comprises a plastic-crystal or a plastic-crystal based solid electrolyte. Examples of plastic-crystals are listed in H. Zhu et al., "Organic Ionic Plastic Crystals as Solid-State Electrolytes", Trends in Chemistry, April 2019, Vol. 1, No. 1, which is herein incorporated by reference. As explained in Zhu, a plastic-crystal is a solid-state material that possess a regular long-range crystalline lattice with local orientational or rotational disorder with respect to the molecular or ionic species.

In some embodiments, the plastic-crystal 525 comprises an organic compound and a lithium salt. In some embodiments, the organic compound is selected from a group consisting of alkylmethylpyrrolidinium imide, N-ethyl-N-methylpyrrolidinium tetrafluoroborate, N,N-dimethylethylenediamine, 2-methylimidazolium triflate, 2-methylimidazolinium triflate, N-ethyl-N-methylpyrrolidinium bis(fluorosulfonyl)amide, N-ethyl-N-methylpyrrolidinium bis(fluorosulfonyl)imide, succinonitrile, ethyl methylpyrrolidinium bis(trifluoromethanesulfonyl)amide, triisobutyl(methyl)phosphonium bis(fluorosulfonyl)imide, N,N-diethyl-N-methyl-N-(n-propyl)ammonium trifluoromethyltrifluoroborate, N,N'-diethyl-3-methylpyrazolium bis(trifluoromethanesulfonyl)imide, pyrazolium imide, N-methyl-N-ethylpyrrolidinium bis(trifluoromethanesulfonyl)amide, and combinations thereof. In some embodiments, the lithium salt is selected from a group consisting of lithium perchlorate ($LiClO_4$), lithium bis(trifluoromethanesulfonyl)imide, (LiTFSI), lithium bis(fluorosulfonyl)imide (LiFSI), lithium difluoro(oxalate)borate (LiDFOB), lithium bis(oxalato)borate (LiBOB), lithium tetrafluoroborate ($LiBF_4$), lithium hexafluorophosphate ($LiPF_6$), and combinations thereof.

In some embodiments, the electron conducting material 530 is selected from a group consisting of carbon black particles, carbon nanotubes, carbon nanofibers, and a conductive polymer (e.g., polyaniline, polyacetylene, polyphenylene vinylene, polypyrrole, polythiophene, polyphenylene sulfide). In some embodiments, the electron conducting material 530 promotes electrical conduction in the all-solid-state battery 500. In some embodiments, when the electron conducting material 530 comprises carbon black particles, the carbon black particles 530 have a diameter of about 10 nanometers to 50 nanometers.

The second layer of the ionically conducting oxide 510 does not define any through pores. That is, there are no pores in the second layer 510 that go through the second layer 510 from the first layer of the ionically conducting oxide 505 to the anode 515. In some embodiments, the second layer 510 is about 5 microns to 40 microns thick, about 10 microns to 18 microns thick, or about 14 microns thick. In some embodiments, the second layer 510 is about 95% dense (i.e., 95% of the theoretical density of the ionically conducting oxide). In some embodiments, any porosity in the second layer 510 is all closed porosity. The second layer 510 serves as a separator in the all-solid-state battery 500.

In some embodiments, the anode 515 comprises lithium. In some embodiments, the anode is about 5 microns to 250 microns thick, 10 microns to 100 microns thick, or about 15 microns thick.

The first current collector 517 and the second current collector 519 are electrically conductive. In some embodiments, the first current collector 517 and the second current collector 519 comprise a metal. In some embodiments, the first current collector 517 and the second current collector 519 comprise a metal selected from a group consisting of copper, aluminum, nickel, titanium, stainless steel, silver, gold, and platinum. In some embodiments, the first current collector 517 and/or second current collector 519 comprise a metal mesh (e.g., a stainless steel mesh).

Figure 6:
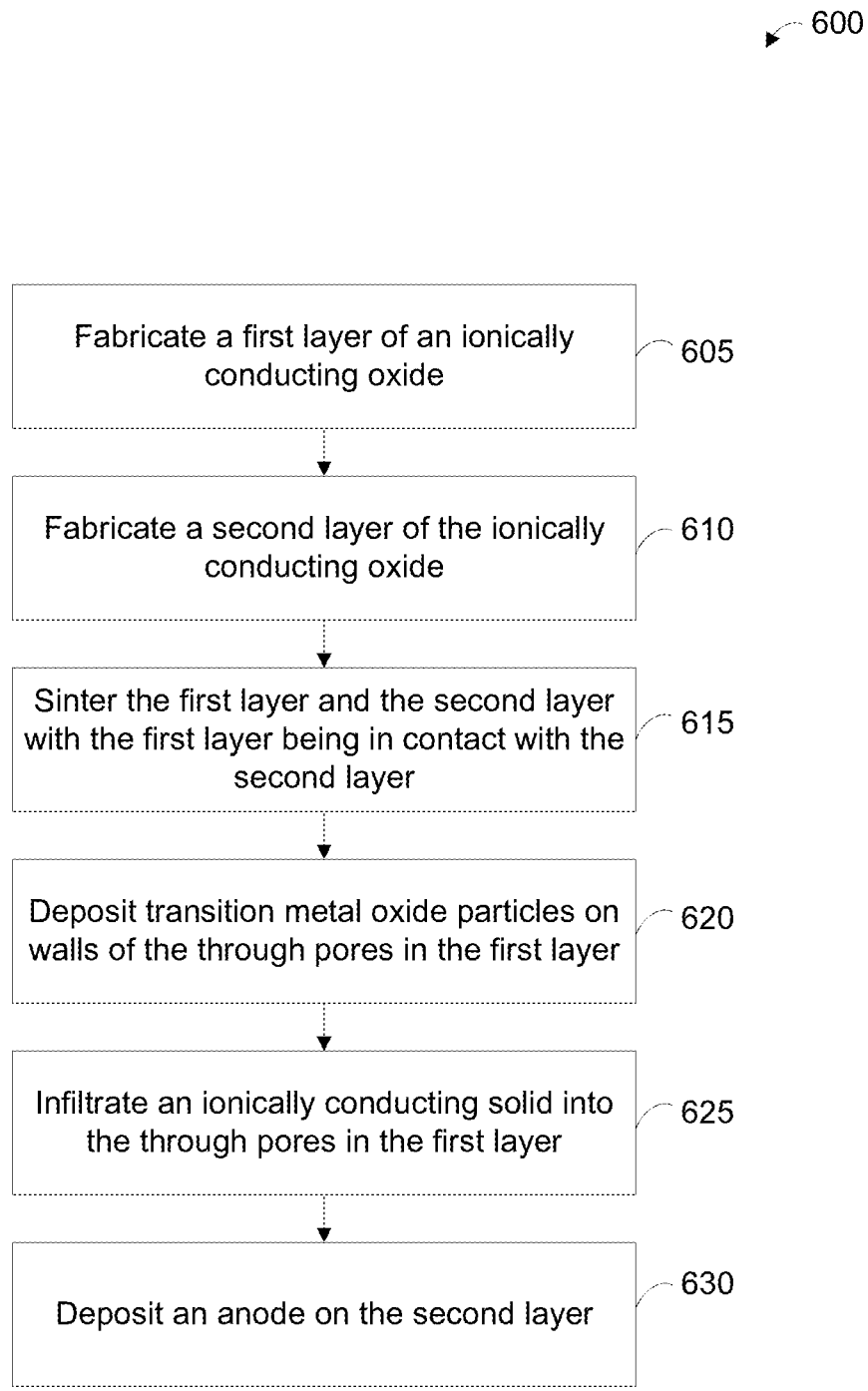
FIG. 6 shows an example of a flow diagram illustrating a manufacturing process for an all-solid-state battery.

FIG. 6 shows an example of a flow diagram illustrating a manufacturing process for an all-solid-state battery. The process 600 shown in FIG. 6 could be used to manufacture the all-solid-state battery 500. Starting at block 605 of the process 600, a first layer of an ionically conducting oxide is fabricated. In some embodiments, the first layer defines through pores having a tortuosity of about 1. In some embodiments, the first layer is fabricated using a freeze-tape casting process, injection molding, extrusion, three-dimensional printing, fabric/wood templating, laser ablation, or magnetically aligning pore formers that are subsequently removed.

At block 610, a second layer of the ionically conducting oxide, is fabricated. In some embodiments, the second layer does not define any thorough pores. In some embodiments, the second layer is fabricated using a tape casting process or aerosol deposition. For example, using aerosol deposition, the second layer could be deposited onto the first layer.

At block 615, the first layer and the second layer are sintered with the first layer being in contact with the second layer. In some embodiments, the first layer and the second layer comprise ceramic particles held together by a binder after fabrication. Sintering is needed to bind the ceramic particles to one another. In some embodiments, the first layer and the second layer are sintered at about 900° C. to 1100° C. for about 0.5 hours to 3.5 hours.

At block 620, transition metal oxide particles are deposited on walls of the through pores in the first layer. In some embodiments, the transition metal oxide particles are deposited on walls of the through pores in the first layer by drop casting. In some embodiments, prior to block 620, an electron conducting material is deposited on surfaces of the transition metal oxide particles. In some embodiments, the electron conducting material is deposited on surfaces of the transition metal oxide particles by mixing the conductive material and the transition metal oxide particles together prior to depositing the transition metal oxide particles onto the walls of the first layer. In some embodiments, an electron conducting material is deposited on walls of the through pores in the first layer prior to the transition metal oxide particles being deposited.

At block 625, an ionically conducting solid is infiltrated into the through pores in the first layer. For example, in some embodiments, the ionically conducting solid is melt infiltrated into the through pores in the first layer.

At block 630, an anode is deposited on the second layer. In some embodiments, the anode is melt bonded in the second layer. In some embodiments, a material that the anode wets is deposited (e.g., using sputter deposition or wet chemical coating) on the second layer before depositing the anode. For example, when lithium is the anode, gold, zinc, tin, indium, germanium, aluminum, or graphite may be deposited on the second layer before depositing the lithium anode.

Figure 10:
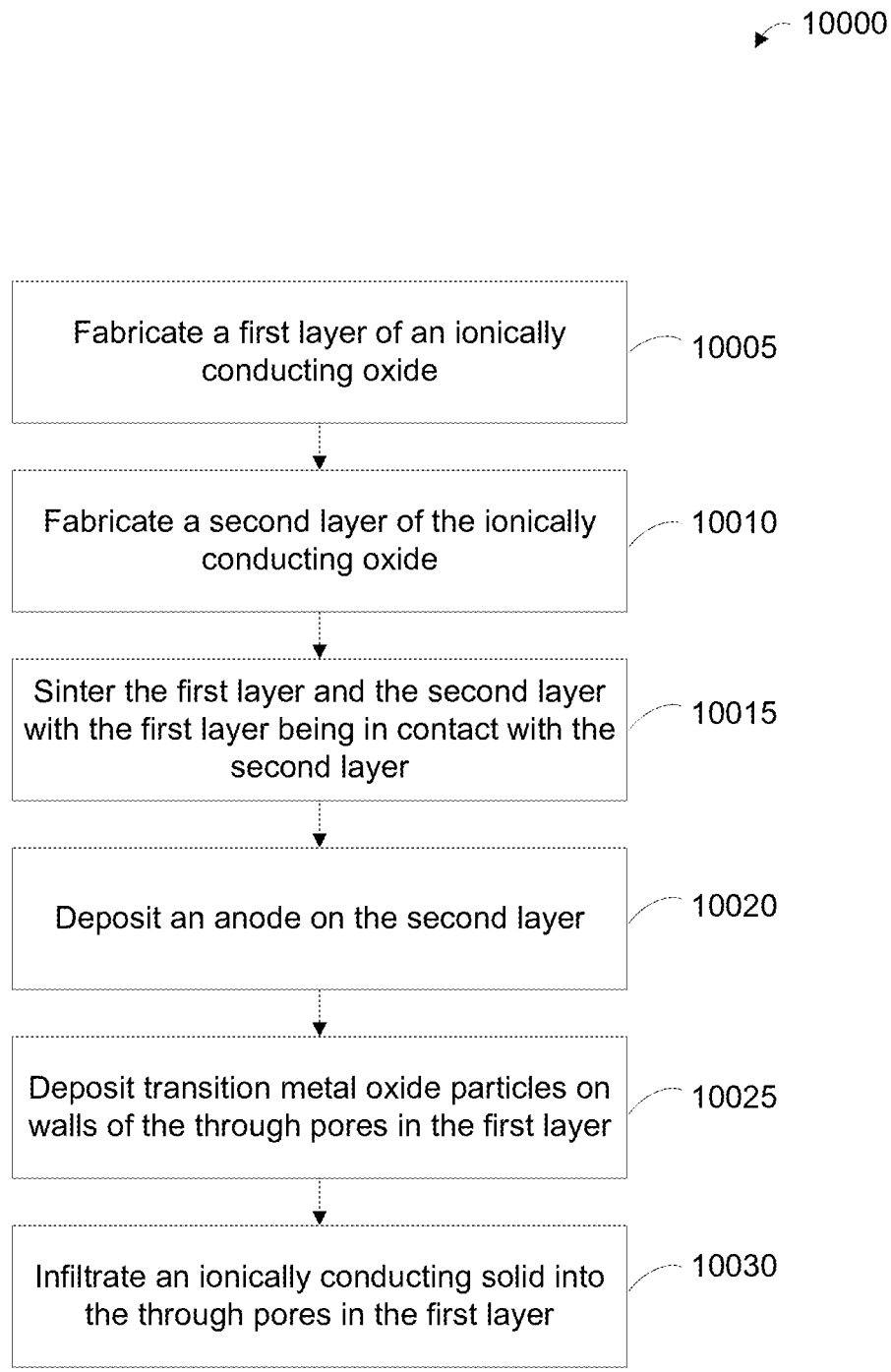
FIG. 10 shows an example of a flow diagram illustrating a manufacturing process for an all-solid-state battery.

FIG. 10 shows an example of a flow diagram illustrating a manufacturing process for an all-solid-state battery. In some embodiments, the process 10000 shown in FIG. 10 uses the same specific methods and process conditions as the process 600 shown in FIG. 6. Starting at block 10005 of the process 10000, a first layer of an ionically conducting oxide is fabricated. In some embodiments, the first layer defines through pores having a tortuosity of about 1.

At block 10010, a second layer of the ionically conducting oxide, is fabricated. In some embodiments, the second layer does not define any thorough pores. In some embodiments, the second layer is fabricated using a tape casting process or aerosol deposition. For example, using aerosol deposition, the second layer could be deposited onto the first layer.

At block 10015, the first layer and the second layer are sintered with the first layer being in contact with the second layer. In some embodiments, the first layer and the second layer comprise ceramic particles held together by a binder after fabrication. Sintering is needed to bind the ceramic particles to one another. In some embodiments, the first layer and the second layer are sintered at about 900° C. to 1100° C. for about 0.5 hours to 3.5 hours.

At block 10020, an anode is deposited on the second layer. In some embodiments, the anode is melt bonded in the second layer. In some embodiments, a material that the anode wets is deposited (e.g., using sputter deposition or wet chemical coating) on the second layer before depositing the anode. For example, when lithium is the anode, gold, zinc, tin, indium, germanium, aluminum, or graphite may be deposited on the second layer before depositing the lithium anode.

At block 10050, transition metal oxide particles are deposited on walls of the through pores in the first layer. In some embodiments, the transition metal oxide particles are deposited on walls of the through pores in the first layer by drop casting. In some embodiments, prior to block 10050, an electron conducting material is deposited on surfaces of the transition metal oxide particles. In some embodiments, the electron conducting material is deposited on surfaces of the transition metal oxide particles by mixing the conductive material and the transition metal oxide particles together prior to depositing the transition metal oxide particles onto the walls of the first layer. In some embodiments, an electron conducting material is deposited on walls of the through pores in the first layer prior to the transition metal oxide particles being deposited.

At block 10025, an ionically conducting solid is infiltrated into the through pores in the first layer. For example, in some embodiments, the ionically conducting solid is melt infiltrated into the through pores in the first layer.

In some embodiments, an all-solid-state battery comprises a trilayer of ionically conducting oxide. In some embodiments, an all-solid-state battery comprises a first layer of an ionically conducting oxide, a second layer of the ionically conducting oxide disposed on the first layer, and a third layer of the ionically conducting oxide disposed on the second layer. In some embodiments, the first layer, the materials disposed in the through pores of the first layer, and the second layer are the same as or substantially the same as the first layer and the second layer described with respect to the all-solid-state batter 500 shown in FIG. 5. An all-solid-state battery comprising a trilayer of ionically conducting oxide does not include a foil anode, however.

In some embodiments, the third layer of ionically conducting oxide is substantially similar to the first layer of ionically conducting oxide. In some embodiments, the third layer is about 10 microns to 500 microns thick, about 10 microns to 300 microns thick, or about 20 to 50 microns thick. In some embodiments, the anode (e.g., lithium) is disposed on wall of the through pores of the third layer.

For example, the anode could be melt infiltrated into the third layer. In some embodiments, a material that the anode wets is deposited (e.g., using sputter deposition or wet chemical coating) on the third layer before depositing the anode. For example, when lithium is the anode, gold, zinc, tin, indium, germanium, aluminum, or graphite be deposited on the third layer before depositing the lithium anode.

Some of the above-described embodiments are directed toward lithium all-solid-state batteries. A sodium all-solid-state battery could also be fabricated. For example, a sodium conducting oxide is used for the ionically conducting oxide. Examples of sodium conducting oxides include $Na_{1+x}Zr_2Si_xP_{3-x}O_{12}$ (0≤x≤3) (i.e., NASICON) and $\beta''$-$Al_2O_3$ derivatives, e.g., $Na_{1.67}Al_{10.67}Li_{0.33}O_{17}$ and $Na_{1.67}Al_{10.33}Mg_{0.67}O_{17}$. An ionically conducting solid comprising an organic compound (e.g., succinonitrile and other organic compounds described herein) and a sodium salt (e.g., sodium perchlorate ($NaClO_4$), sodium bis(trifluoromethanesulfonyl)imide (NaTFSI), sodium bis(fluorosulfonyl)imide (NaFSI), sodium difluoro(oxalate)borate (NaDFOB), sodium bis(oxalato)borate (NaBOB), sodium tetrafluoroborate ($NaBF_4$), sodium hexafluorophosphate ($NaPF_6$), and mixtures thereof) is disposed in through pores of the first layer of the sodium conducting oxide. The cathode comprises a transition metal oxide or a polyanionic compound. The anode comprises sodium metal, a sodium alloy, hard carbon, or a titanate.

Figure 7:
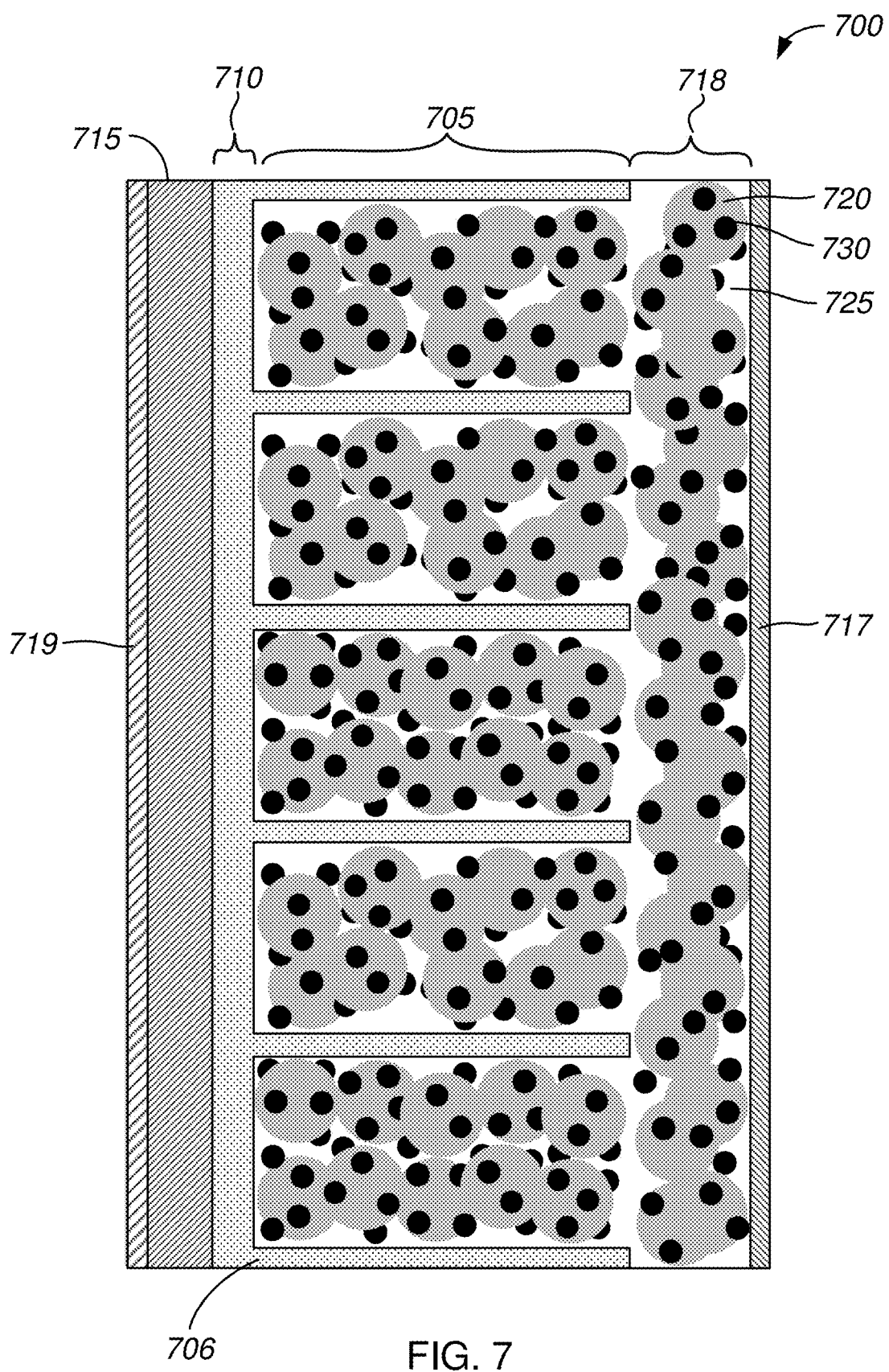
FIGS. 7-9 show examples of schematic illustrations of all-solid-state batteries.
Figure 8:
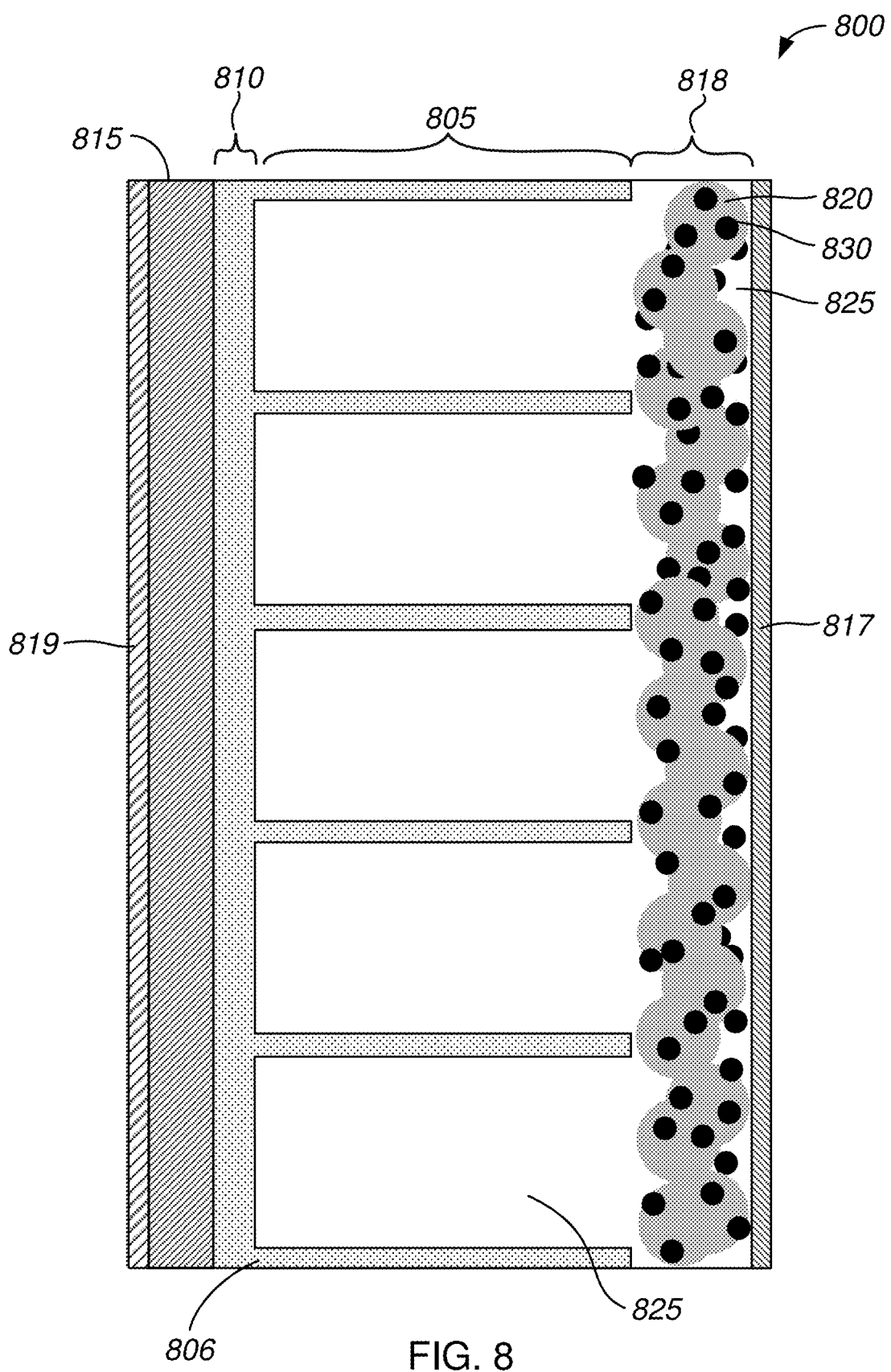
Figure 9:
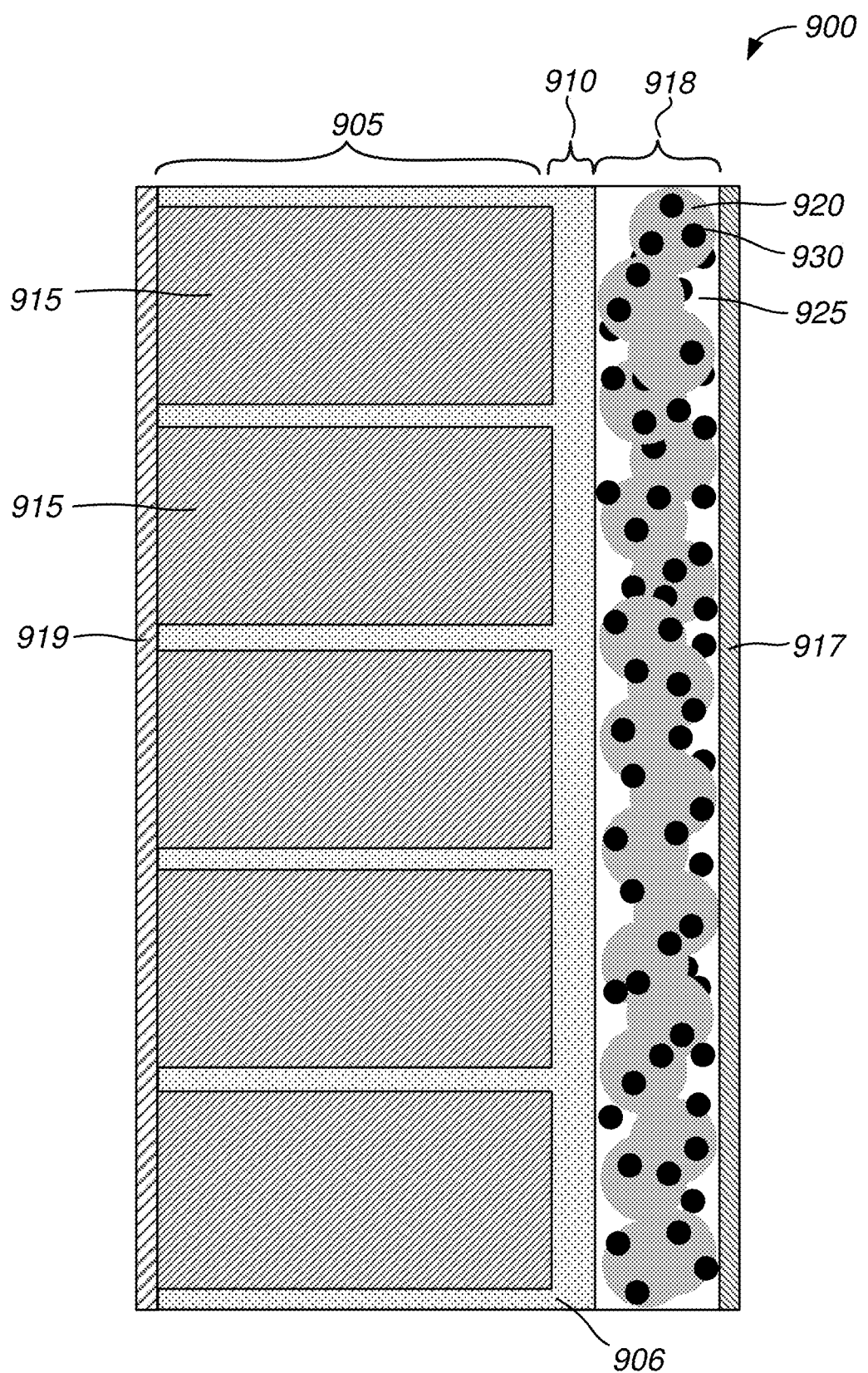

Other configurations of an all-solid-state-battery are possible. FIGS. 7-9 show examples of schematic illustrations of all-solid-state batteries. The all-solid-state-batteries 700, 800, and 900 shown in FIGS. 7, 8, and 9, respectively, may incorporate the same materials and have the same dimensions (e.g., particle sizes, layer thicknesses) as the all-solid-state-battery 500 shown in FIG. 5.

As shown in FIG. 7, the all-solid-state battery 700 comprises a first layer of an ionically conducting oxide 705, a second layer of the ionically conducting oxide 710 disposed on the first layer 705, and an anode disposed 715 on the second layer of the ionically conducting oxide 710. The first layer of the ionically conducting oxide 705 defines through pores 707.

The first layer of the ionically conducting oxide 705 includes materials disposed in the through pores 707, including transition metal oxide particles 720 and an ionically conducting solid 725. The transition metal oxide particles 720 serve as a cathode in the all-solid-state battery 700. The ionically conducting solid 725 serves as an electrolyte in the all-solid-state battery 700. In some embodiments, an electron conducting material 730 is disposed in the through pores 707. In some embodiments, the electron conducting material 730 is disposed on surfaces of the transition metal oxide particles.

Disposed on the first layer of the ionically conducting oxide 705 (and on the materials disposed in the through pores 707 of the first layer of the ionically conducting oxide 705) is a layer 718 of the ionically conducting solid 725. In some embodiments, the layer 718 includes transition metal oxide particles 720 and the electron conducting material 730. In some embodiments, the layer 718 is a cathode/electron conductor/binder composite.

In some embodiments, the all-solid-state battery 700 further comprises a first current collector 717 disposed on the layer 718. In some embodiments, the all-solid-state battery 700 further comprises a second current collector 719 disposed on the anode 715.

As shown in FIG. 8, an all-solid-state battery 800 comprises a first layer of an ionically conducting oxide 805, a second layer of the ionically conducting oxide 810 disposed on the first layer 805, and an anode disposed 815 on the second layer of the ionically conducting oxide 810. The first layer of the ionically conducting oxide 805 defines through pores 807.

The first layer of the ionically conducting oxide 805 includes an ionically conducting solid 825 disposed in the through pores 807. The ionically conducting solid 825 serves as an electrolyte in the all-solid-state battery 800.

Disposed on the first layer of the ionically conducting oxide 805 (and on the ionically conducting solid 825 disposed in the through pores 807 of the first layer of the ionically conducting oxide 805) is a layer 818 of the ionically conducting solid 825 and the transition metal oxide particles 820. In some embodiments, an electron conducting material 830 is disposed in the layer 818. In some embodiments, the electron conducting material 830 is disposed on surfaces of the transition metal oxide particles. In some embodiments, the layer 818 is a cathode/electron conductor/binder composite.

In some embodiments, the all-solid-state battery 800 further comprises a first current collector 817 disposed on the layer 818. In some embodiments, the all-solid-state battery 800 further comprises a second current collector 819 disposed on the anode 815.

As shown in FIG. 9, an all-solid-state battery 900 comprises a first layer of an ionically conducting oxide 905 and a second layer of the ionically conducting oxide 910 disposed on the first layer 905. The first layer of the ionically conducting oxide 905 defines through pores 907. The first layer of the ionically conducting oxide 905 includes an anode disposed 915 disposed in the through pores 907.

Disposed on the second layer of the ionically conducting oxide 910 is a layer 918 of the ionically conducting solid 925 and transition metal oxide particles 920. The ionically conducting solid 925 serves as an electrolyte in the all-solid-state battery 900. In some embodiments, an electron conducting material 930 is disposed in the layer 918. In some embodiments, the electron conducting material 930 is disposed on surfaces of the transition metal oxide particles. In some embodiments, the layer 918 is a cathode/electron conductor/binder composite.

In some embodiments, the all-solid-state battery 900 further comprises a first current collector 917 disposed on the layer 918. In some embodiments, the all-solid-state battery 900 further comprises a second current collector 919 disposed on the first layer 905 and the anode 915.

In some embodiments, the layers 718, 818, and 918 described in FIGS. 7, 8, and 9, respectively, are made using a tape-casting process. For example, a mixture of cathode (i.e., the transition metal oxide particles), electron conducting material, and binder is dispersed in a solvent (e.g., N-methyl-2-pyrrolidone) and is spread on a current collector (e.g., a sheet of aluminum or an aluminum foil) using a doctor blade. The solvent is allowed to evaporate. The layer is then incorporated into the all-solid-state battery structure using the ionically conducting solid. For example, the ionically conducting solid (melting temperature of about 40° C. to 100° C., or about 60° C., can be melted, infiltrated into the layer of cathode and electron conducting material, and allowed to solidify. The infiltrated ionically conducting solid can bind with the underlying ionically conducting solid and/or ionically conducting oxide.

Figure 11:
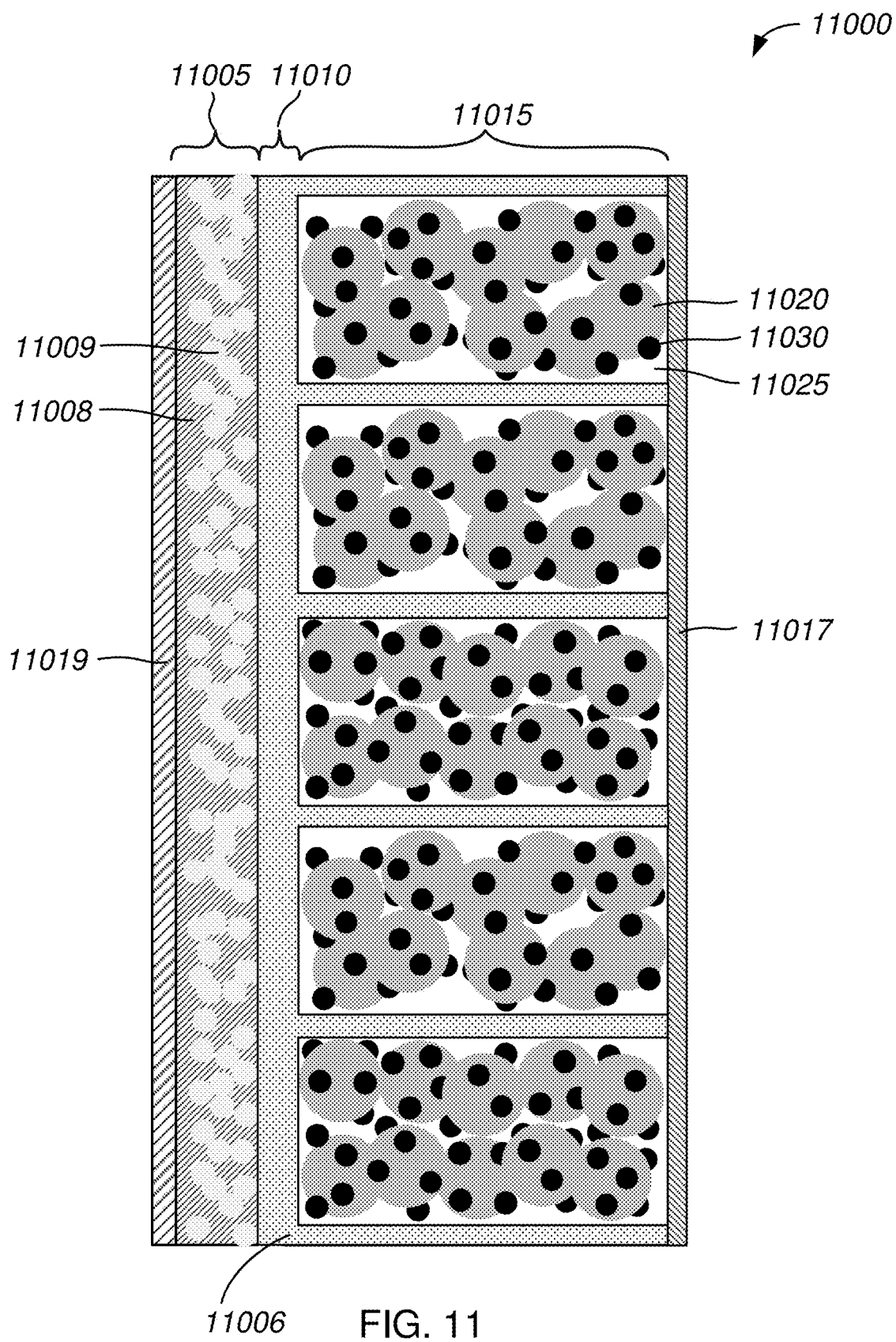
FIG. 11 shows an example of a schematic illustration of an all-solid-state battery.

FIG. 11 shows an example of a schematic illustration of an all-solid-state battery. The all-solid-state-battery 11000 shown in FIG. 11, may incorporate the same materials and have the same dimensions (e.g., particle sizes, layer thicknesses) as the all-solid-state-battery 500 shown in FIG. 5.

The all-solid-state battery 11000 shown in FIG. 11 has a trilayer configuration.

The all-solid-state battery 11000 comprises a first layer of an ionically conducting oxide 11005 and a second layer of the ionically conducting oxide 11010 disposed on the first layer 11005. The first layer of the ionically conducting oxide 11005 defines through pores 11007. An anode layer 11005 is disposed on the second layer of the ionically conducting oxide 11010. The anode layer 11005 comprises a layer of the ionically conducting solid 11009 having an isotropic/random pore structure in which an anode material 1108 is disposed.

The first layer of the ionically conducting oxide 11005 includes materials disposed in the through pores 11007, including transition metal oxide particles 11020 and an ionically conducting solid 11025. The transition metal oxide particles 11020 serve as a cathode in the all-solid-state battery 11000. The ionically conducting solid 11025 serves as an electrolyte in the all-solid-state battery 11000. In some embodiments, an electron conducting material 11030 is disposed in the through pores 11007. In some embodiments, the electron conducting material 11030 is disposed on surfaces of the transition metal oxide particles.

In some embodiments, the all-solid-state battery 11000 further comprises a first current collector 11017 disposed on the first layer 11005. In some embodiments, the all-solid-state battery 11000 further comprises a second current collector 11019 disposed on the anode 11015.

In some embodiments, the layer of the ionically conducting solid 11009 is fabricated by disposing a dispersion of a powder of the ionically conducting solid on the sintered bilayer (i.e., on the second layer 11010 that has been sintered to first layer 11015). The dispersion may be deposited on the sintered bilayer by drop-casting, spin-coating, or aerosol deposition, for example. In some embodiments, the structure is then heated to about 800° C. to 1100° C. for about 0.1 hour to hour. The low temperature and short time at which the structure is held at the elevated temperature limits the densification of the layer of the ionically conducting solid 11009, resulting in a porous structure. In some embodiments, the dispersion includes pore formers and/or binders to aid in controlling pore formation.

The limited densification and grain growth of the powder of the ionically conducting solid in the anode layer 11005 may be beneficial in achieving a high surface area. This can lower the effective current density and allow for cycling of the all-solid-state battery at higher current densities compared to all-solid-state batteries having a two-dimensional ionically conducting solid-anode interface.

The following examples are intended to be examples of the embodiments disclosed herein, and are not intended to be limiting.

EXAMPLE

In this study, the issues associated with all-solid-state batteries were addressed by combining tape-casting and freeze tape casting (FTC) methods to construct porous/dense and porous/dense/porous bi-/tri-layer $Li_7La_3Zr_2O_{12}$ (LLZO)

frameworks in which the porous layers are composed of vertically aligned LLZO walls functioning as directional ion conduction pathways. ASSBs were constructed by infiltrating active material and other components into the porous layers and adhering Li metal to the dense side of the bilayer framework. The cathode/LLZO interfacial impedance was reduced by introducing a plastic-crystal solid electrolyte into the porous layers. No liquid electrolytes were added to these devices to make them function.

LLZO was selected due to its high ionic conductivity (0.1-1.3 mS cm$^{-1}$), wide electrochemical stability window (~6V), chemical stability to Li, and dry air stability. FTC, a combination of freeze-casting and tape-casting, is a scalable method for making thin porous films, with good control over total pore volume, pore size, and morphology. In addition, tape thicknesses ranging from several millimeters to <100 microns can be fabricated, while retaining pore alignment throughout the thickness. A key feature of the FTC prepared LLZO scaffolds is the low tortuosity (approaching unity) pore channels along the thickness direction, which aids infiltration and shortens Li diffusion path lengths. Furthermore, structurally resilient FTC-LLZO scaffolds can be readily prepared at very high porosities in the green state, exceeding 90%, compared to methods using traditional pore-forming fugitives. The FTC process is also environmentally friendly as ice crystals function as the pore-former, not polymers, which generate $CO_2$ during burnout. Another factor aiding device design was the incorporation of a plastic-crystal solid electrolyte into the pores, which acts as a mediator to connect the cathode material and the LLZO, thus avoiding the need for co-sintering and associated deleterious reactions that may occur at high temperature. This also reduces interfacial impedance and permits stable operation of the ASSBs.

FIGS. 1A-1G show aspects of the process for making free-standing dense LLZO films, used as the separators/electrolytes in symmetrical cell cycling. Powders were first ball-milled to reduce and homogenize the particle size and excess $Li_2CO_3$ was added to compensate for lithium loss during the high temperature sintering process. The amount of excess needed is dependent upon the desired sample thickness. The phase purity and microstructure of the sintered films are sensitive to temperature. Nearly transparent, phase-pure, and pinhole-free LLZO films approximately 95% dense and 25-44 µm thick could be fabricated successfully once the process was optimized.

Figures 1A, 1B, 1C:
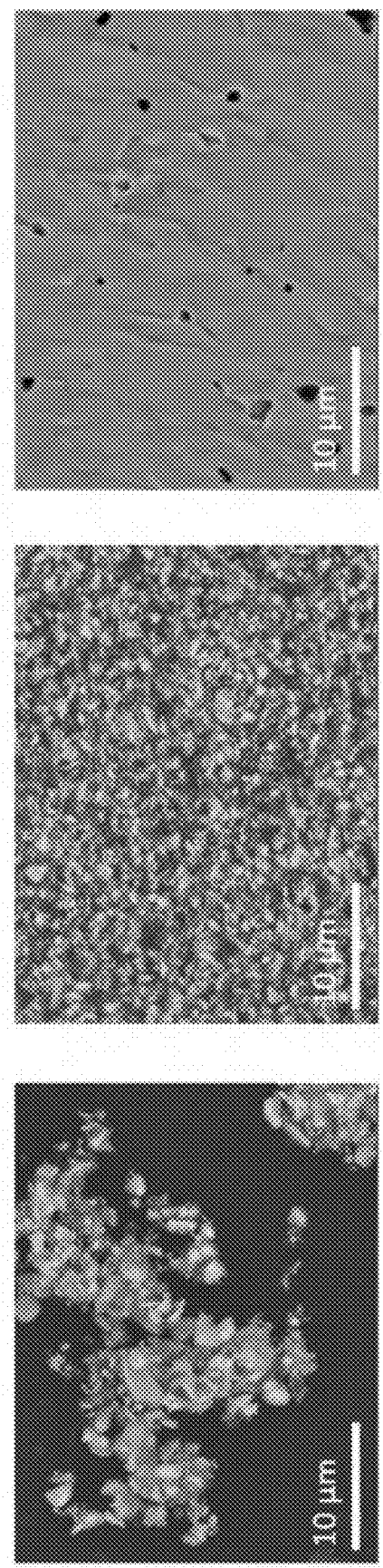
FIG. 1A shows an example of an SEM image of as-received LLZO powder.
FIG. 1B shows an example of an SEM fracture surface image of tape-cast green tape.
FIGS. 1C-1E show examples of SEM fracture surface images of LLZO films sintered in optimal sintering profile.
Figures 1D, 1E, 1F:
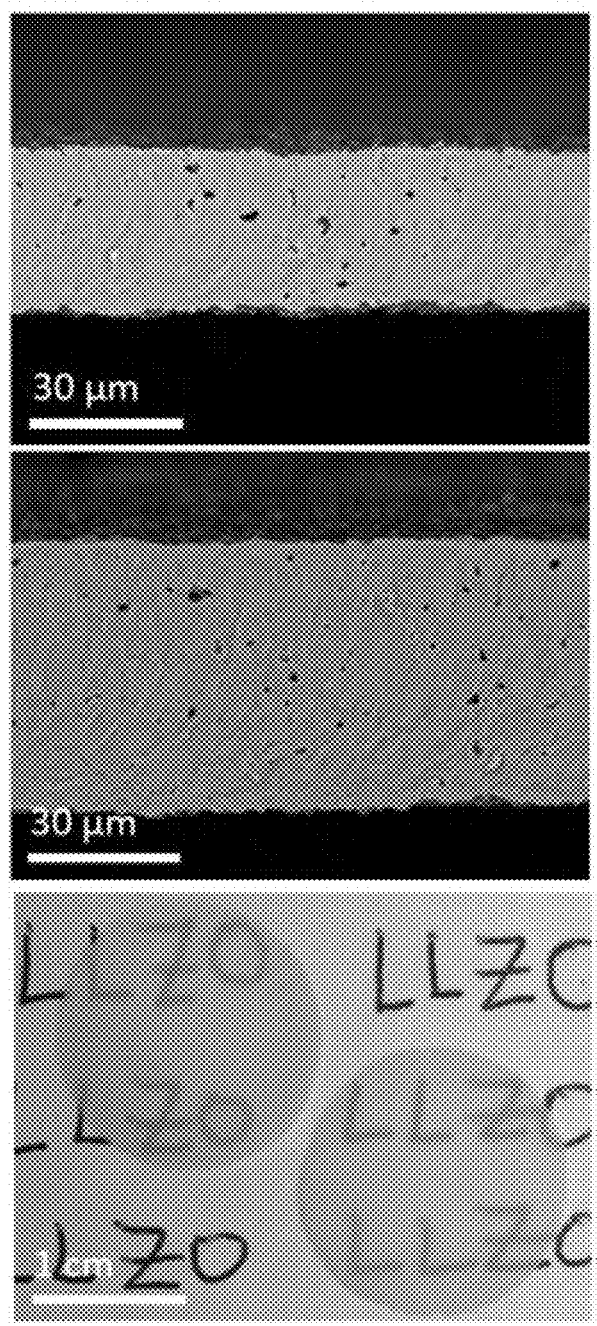
FIG. 1F shows an example of an optical image of an LLZO film sintered in optimal sintering profile.
Figure 1G:
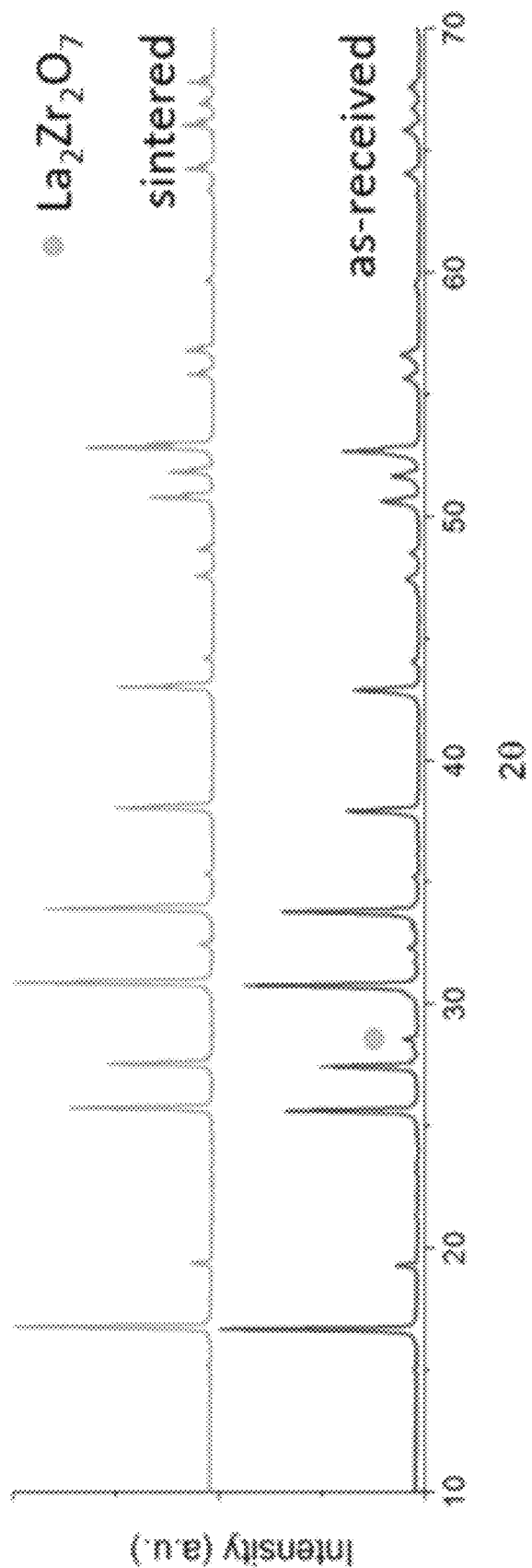
FIG. 1G shows an example of XRD patterns of the as-received powder and the sintered film.
Figure 2A:
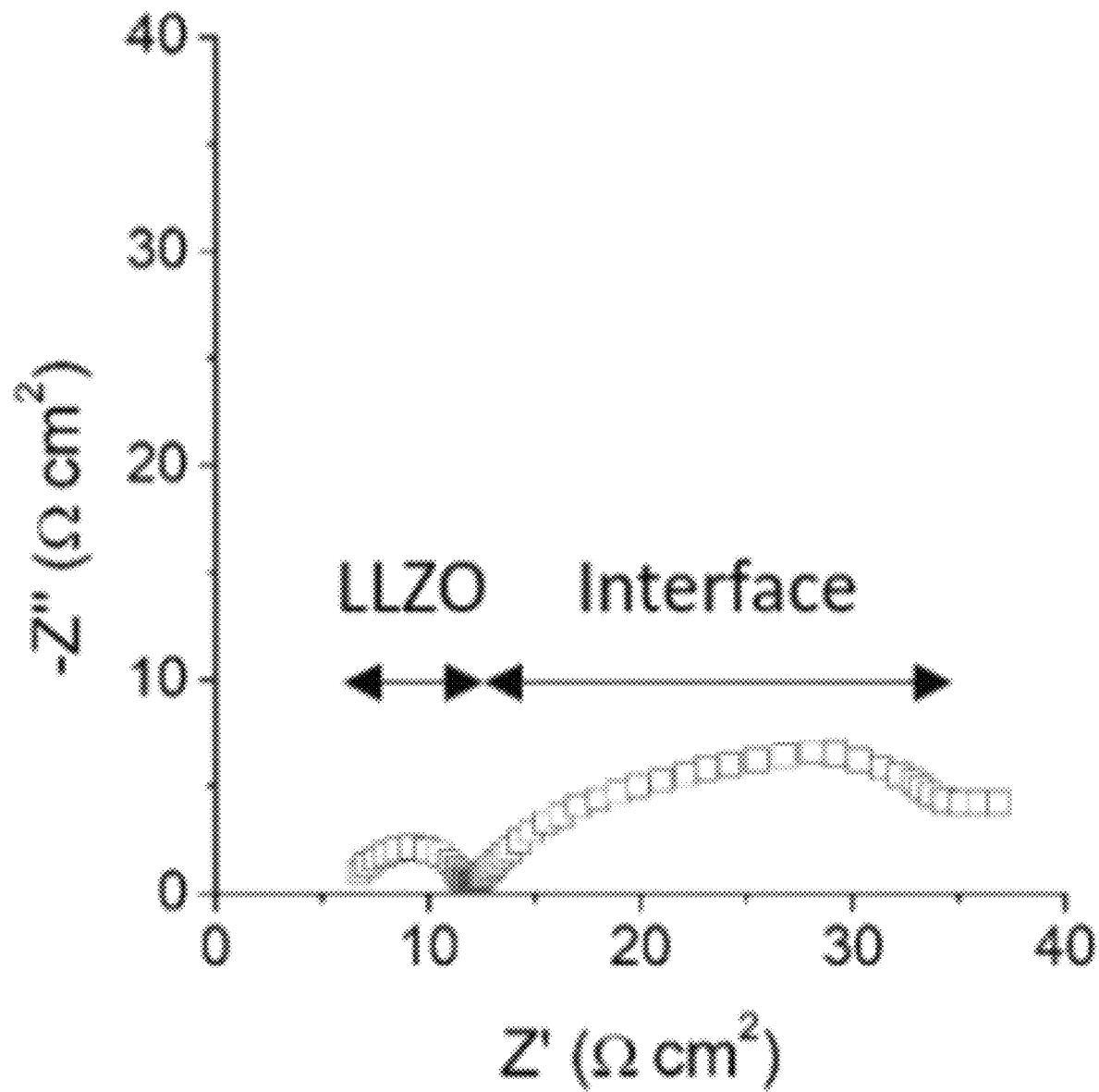
FIG. 2A shows an example of a Nyquist plot of Au interface engineered Li/LLZO/Li cell.
Figure 2B:
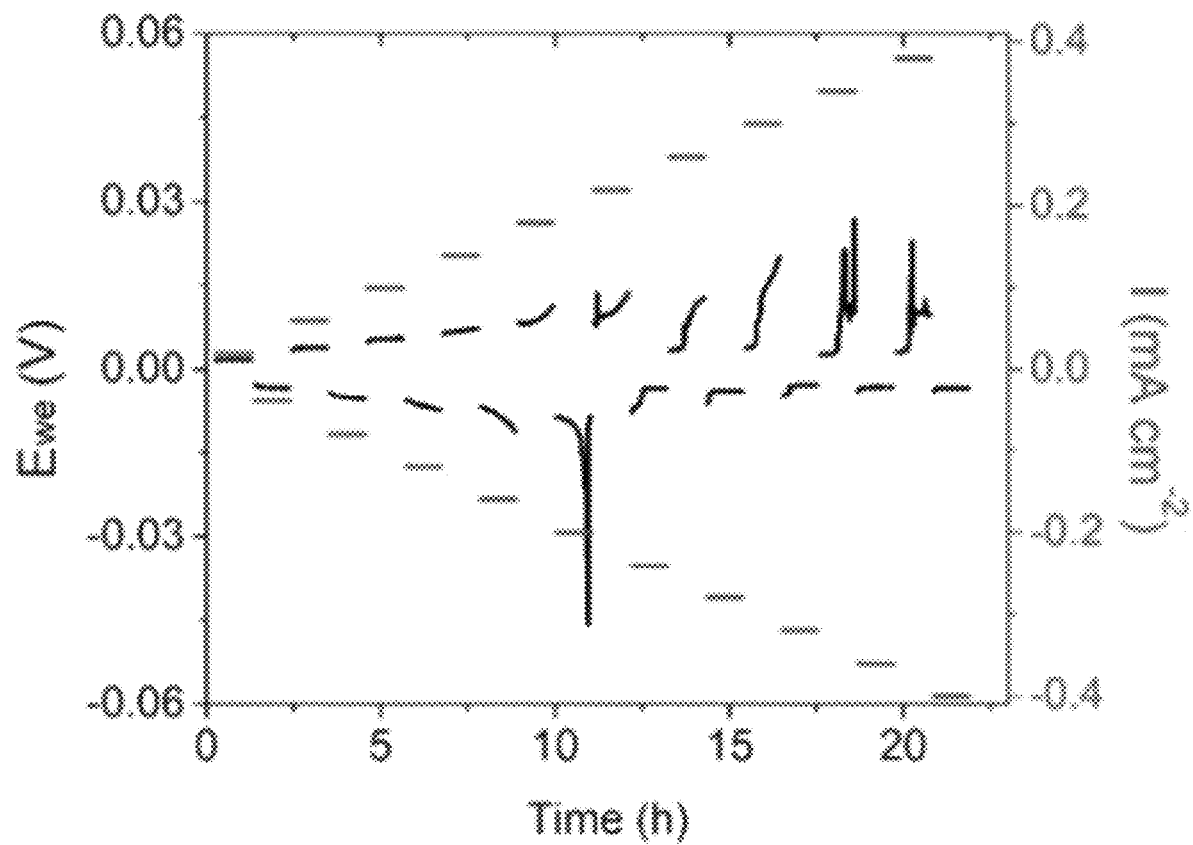
FIG. 2B shows an example of DC cycling of Au interface engineered Li/LLZO/Li cell with a step current of 20 $\mu A\ cm^{-2}$ starting from 20 $\mu A\ cm^{-2}$.
Figure 2C:
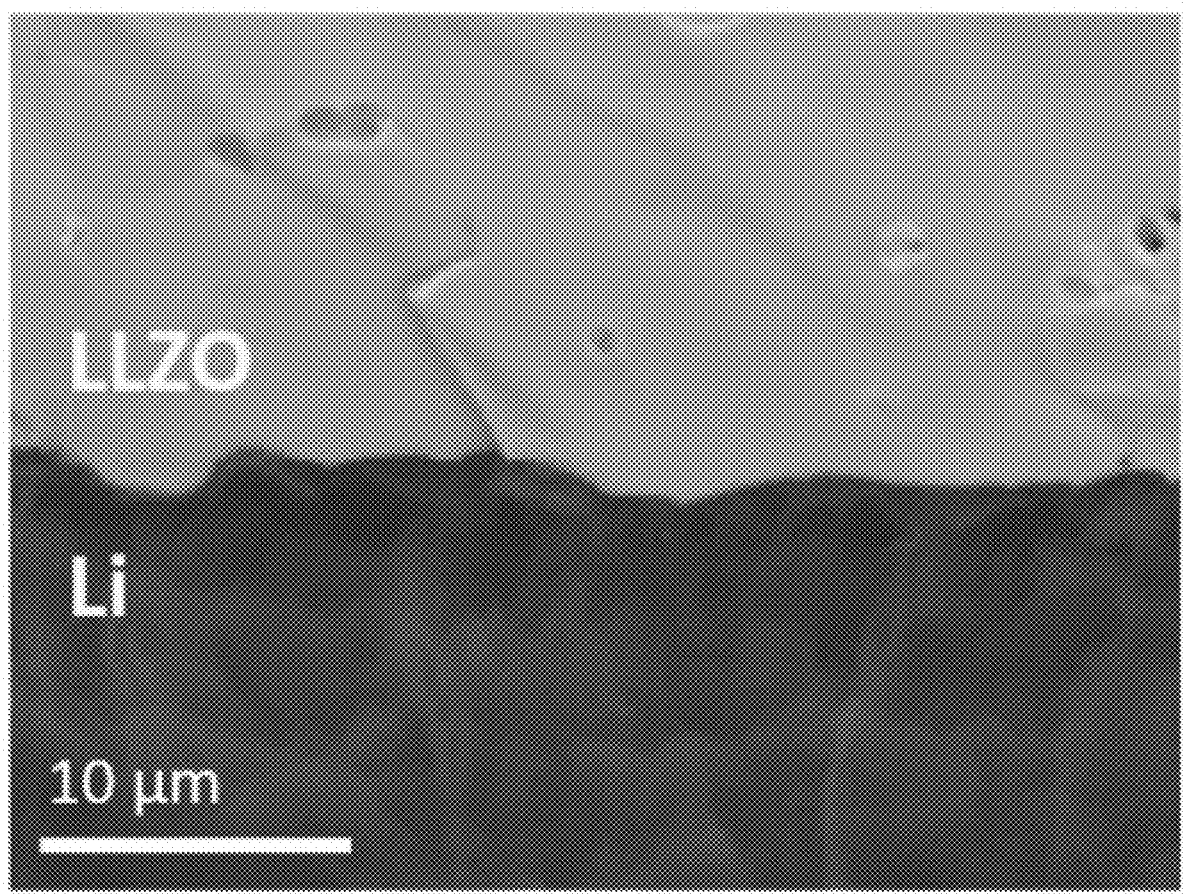
FIG. 2C shows an example of an SEM fracture surface image showing good interfacial bonding of Li and LLZO.

FIGS. 2A-2E show the electrochemical properties of Li/LLZO/Li cells and microstructural features. Au was sputter coated on both sides of the LLZO films to reduce the interfacial resistance. Li metal was melt bonded to the Au coated LLZO resulting in intimate contact (FIG. 2C). The molten Li wets and spreads on Au as the Li—Au alloying reaction has a large negative Gibbs free energy release. In FIG. 2A, three resistive components are observed in the Nyquist plot of the Li/LLZO/Li cell. The high frequency semicircle corresponds to the LLZO resistance, giving a conductivity of 0.5 mS cm$^{-1}$. The depressed semi-circle at the lower frequency range is a combination of Li—Au alloying and Li—Au/LLZO interfacial impedances. The total cell impedance is only 35 Ω cm$^2$, with an interfacial impedance of 12 Ω cm$^2$, comparable to other reported literature values of interface engineered LLZO.

Figure 2D:
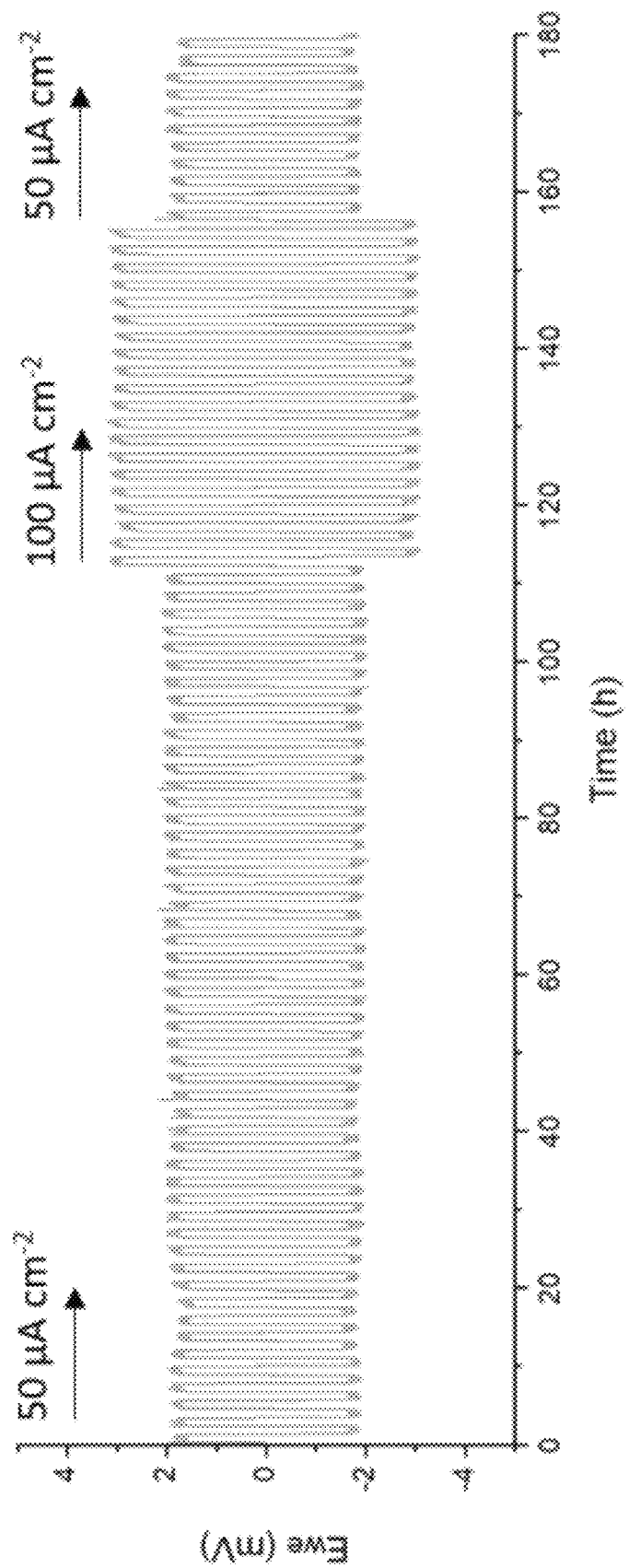
FIG. 2D shows an example of DC cycling of Au interface engineered Li/LLZO/Li cell at selected current densities.
Figure 2E:
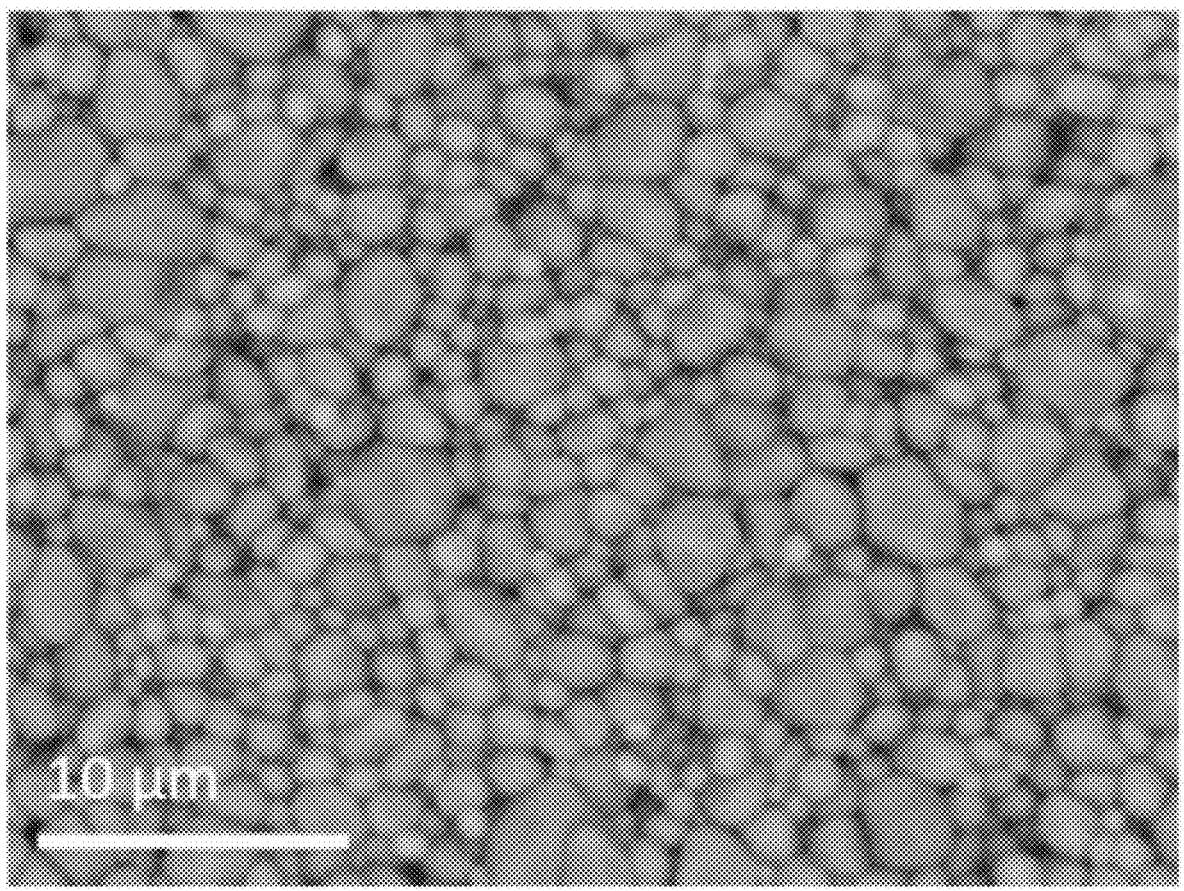
FIG. 2E shows an example of an SEM surface image of typical sintered LLZO thin films.

FIG. 2B shows direct current (DC) cycling of the modified LLZO membrane, stepping the current in increments of 20 µA cm$^{-2}$ starting from 20 µA cm$^2$. Voltage instability is observed at a critical current density of 0.2 mA cm$^{-2}$. Cells could be cycled stably at current densities of 50 and 100 µA cm$^{-2}$ (FIG. 2D). It is well known that the voltage instabilities are due to Li deposition dendrite/filament propagation in grain boundaries or within the bulk of LLZO. The current density at which this occurs heavily depends on the processing history and surface treatment/microstructure of sintered LLZO.

In contrast, symmetrical cells of untreated LLZO exhibited extremely high cell impedance (>50 kΩ cmD) along with instantaneous shorting upon DC cycling at 50 µA cm$^{-2}$. This is generally typical of cells containing untreated LLZO samples unless pressure is applied (which could not be done here due to the fragility of the thin ceramic samples).

Figure 3C:
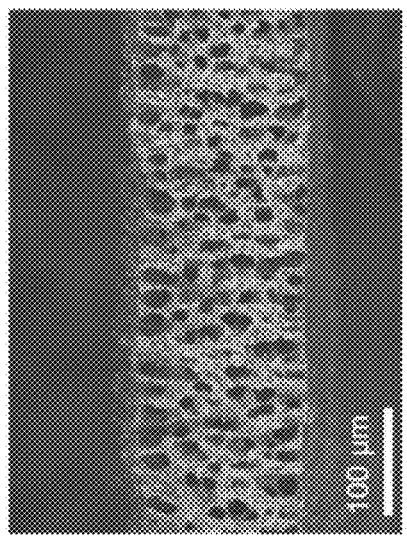
FIGS. 3A-3C show examples of fracture surface SEM micrographs of green tapes freeze tape cast from slurries containing (FIG. 3A) 7.5 vol. % LLZO/400 μm, (FIG. 3B) 10 vol. % LLZO/220 μm, and (FIG. 3C) 10 vol. % LLZO/150 μm.
Figure 3B:
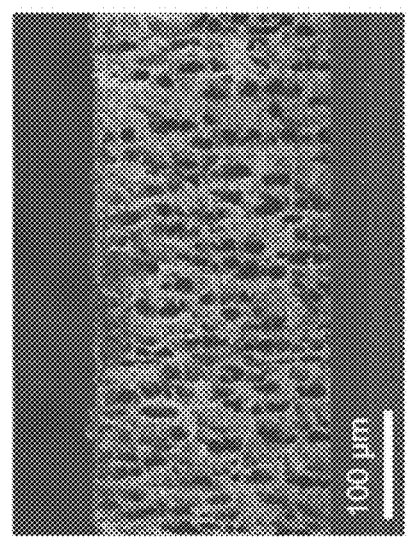
Figure 3A:
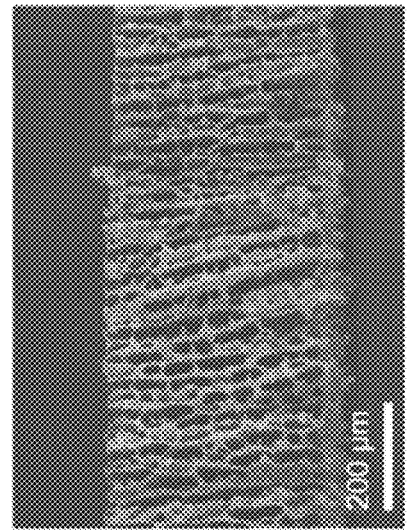
Figure 3D:
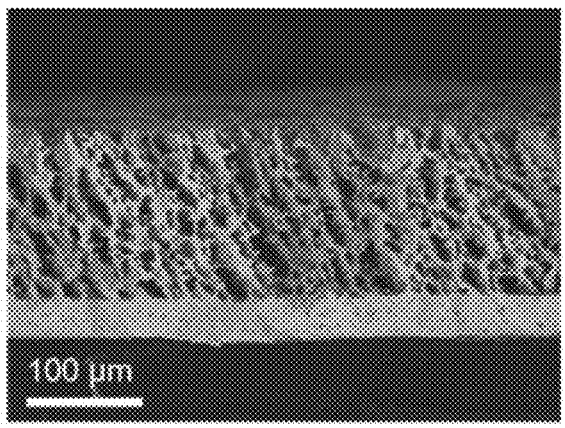
FIGS. 3D-3F show examples of fracture surface micrographs of (FIG. 3D) sintered porous/dense (140/36 μm) bilayer, (FIG. 3E) porous/dense/porous (130/37/130 μm) trilayer, and (FIG. 3F) porous/dense/porous trilayer with a 14 μm dense layer.
Figure 3E:
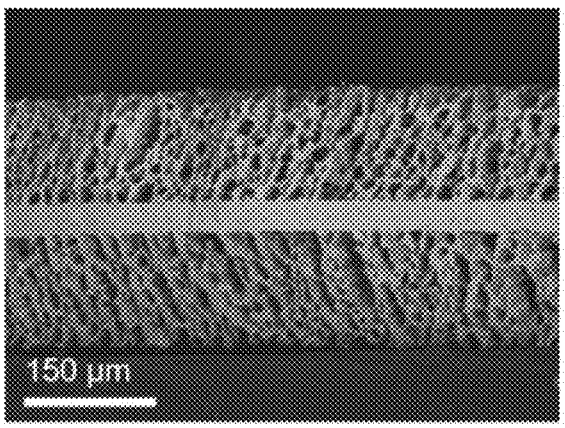
Figure 3F:
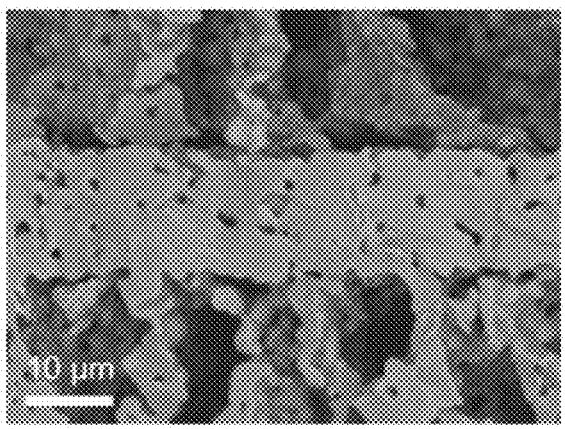

FIGS. 3A-3C show typical cross-sectional fracture surface images of LLZO samples freezetape-cast using different conditions. The green tape cast from the 7.5 vol. % LLZO slurry (FIG. 3A) shows wider spacing between LLZO columns compared to the one cast from 10 vol. % LLZO (FIGS. 3B and 3C). The lower ceramic loading leads to improved LLZO dispersion and results in fewer ice nucleation sites per unit area, favoring more aligned growth of the ice crystals. Interactions with water at higher loadings foster local agglomeration, which can prevent formation of the desired structures. By adjusting the doctor blade gap, green tapes ranging in thickness from 150-400 µm were obtained.

FTC and tape-cast green tapes were stacked together and sintered to form porous/dense bilayer and porous/dense/porous trilayer LLZO architectures (FIGS. 3D-3H). Sintering profiles were optimized to achieve phase purity (cubic-LLZO) and high densities. Typical dense layer thicknesses were 25-35 µm and could be reduced down to 14 µm because the thick porous LLZO layers serve as mechanical supports for the otherwise fragile thin dense films. FTC green tapes made with 10 vol. % LLZO slurry were used which resulted in 70% porosity once sintered.

Figure 3G:
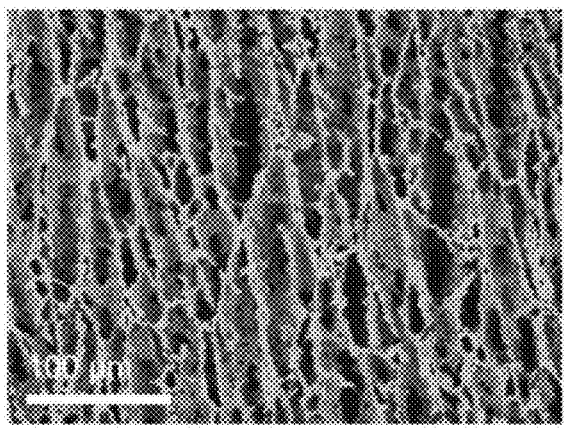
FIG. 3G shows an example of a surface SEM micrograph of the porous layer.
Figure 3H:
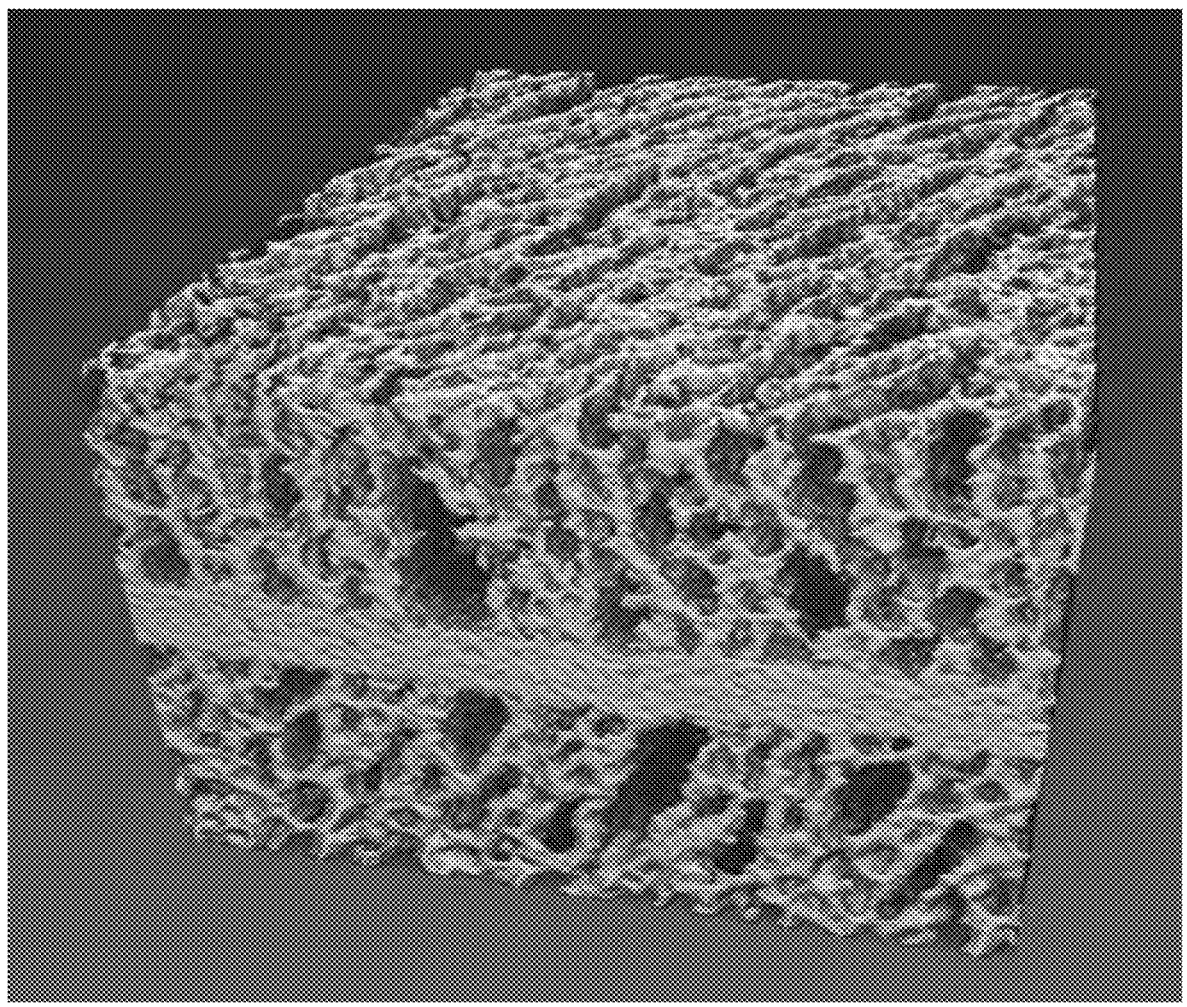
FIG. 3H shows an example of a 3D reconstruction of micro-CT scan of the trilayer. Subvolume size is 400 (width)×280 (height)×530 (depth) $\mu m^3$.
Figure 3I:
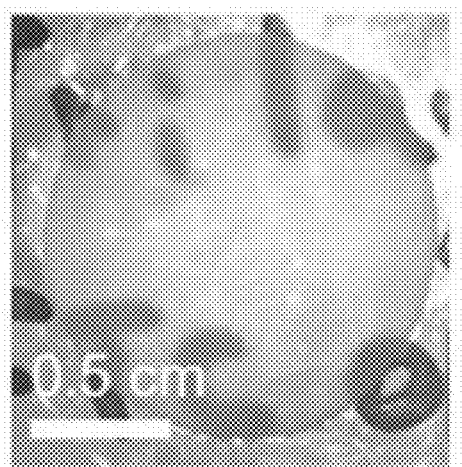
FIG. 3I shows an example of an optical image of a typical trilayer.

Trilayers are advantageous here because the symmetry allows for uniform shrinkage during densification. An optical image of a typical trilayer and a 3D reconstruction of a microcomputed tomography (CT) scan are shown in FIG. 3H. From these, the unidirectional nature of the pores and the absence of closed pores are evident. Fracture surface images show what might appear to be pore blockages but are due to LLZO rods extending from one wall to another. As can be seen in the top surface image (FIG. 3G), the pores are not blocked. Electrode components can be readily infiltrated through the pore openings on the surfaces of the porous layer (FIG. 3G). Critical current densities as high as 10 mA cm$^{-2}$ (based on geometric area) have recently been demonstrated in symmetrical cells based on LLZO trilayer structures in which lithium is infiltrated into porous layers with a random pore structure on each side. Increasing the electrode/electrolyte contact area enhances the effective current density greatly compared to devices with planar interfaces.

Figure 4A:
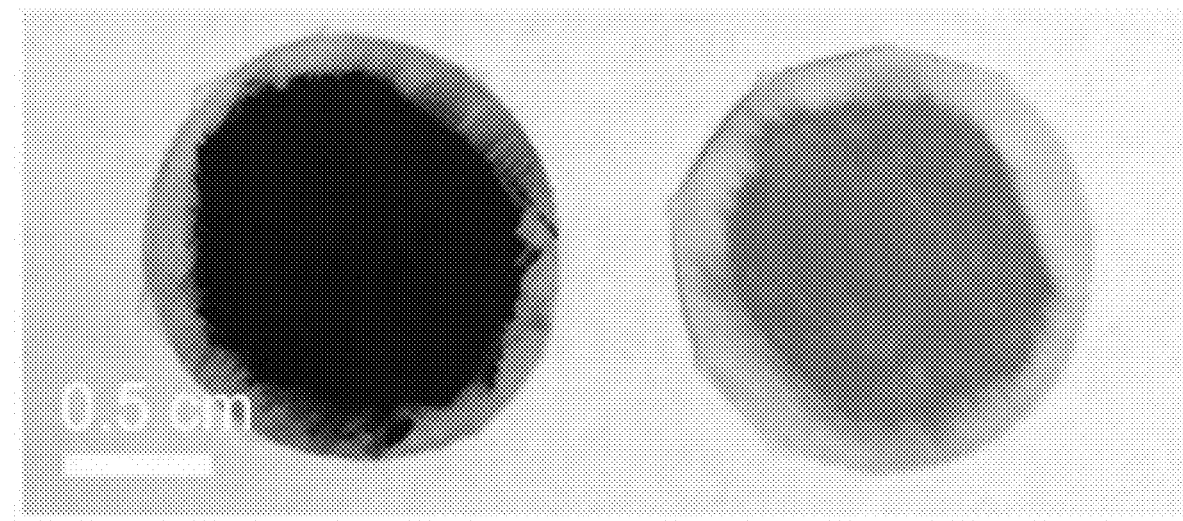
FIG. 4A shows an example of an optical image of cathode infiltrated LLZO bilayer. Cathode infiltrated porous layer surface (left) and dense layer surface (right) are shown.
Figure 4B:
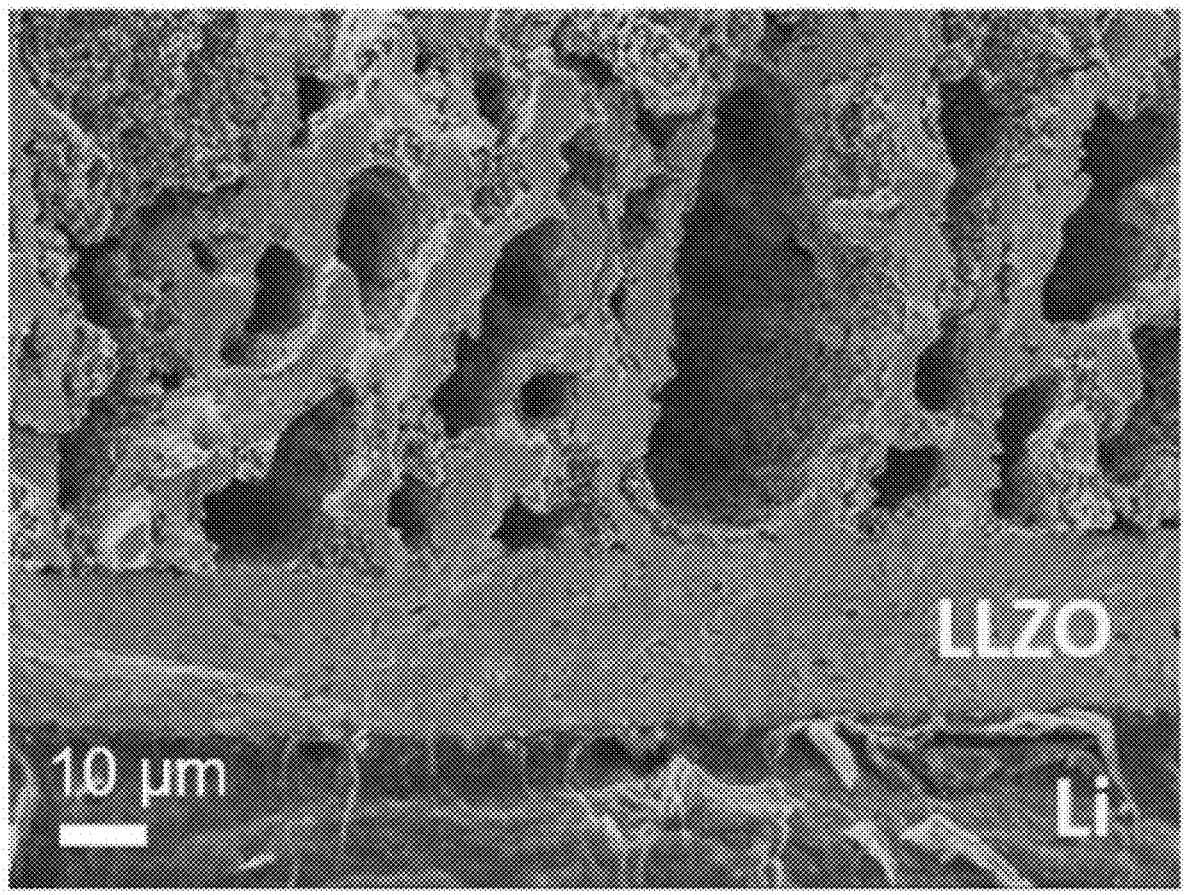
FIG. 4B shows an example of an SEM fracture surface image of cathode-infiltrated bilayer. Images were taken prior to SCN electrolyte infiltration.
Figure 4C:
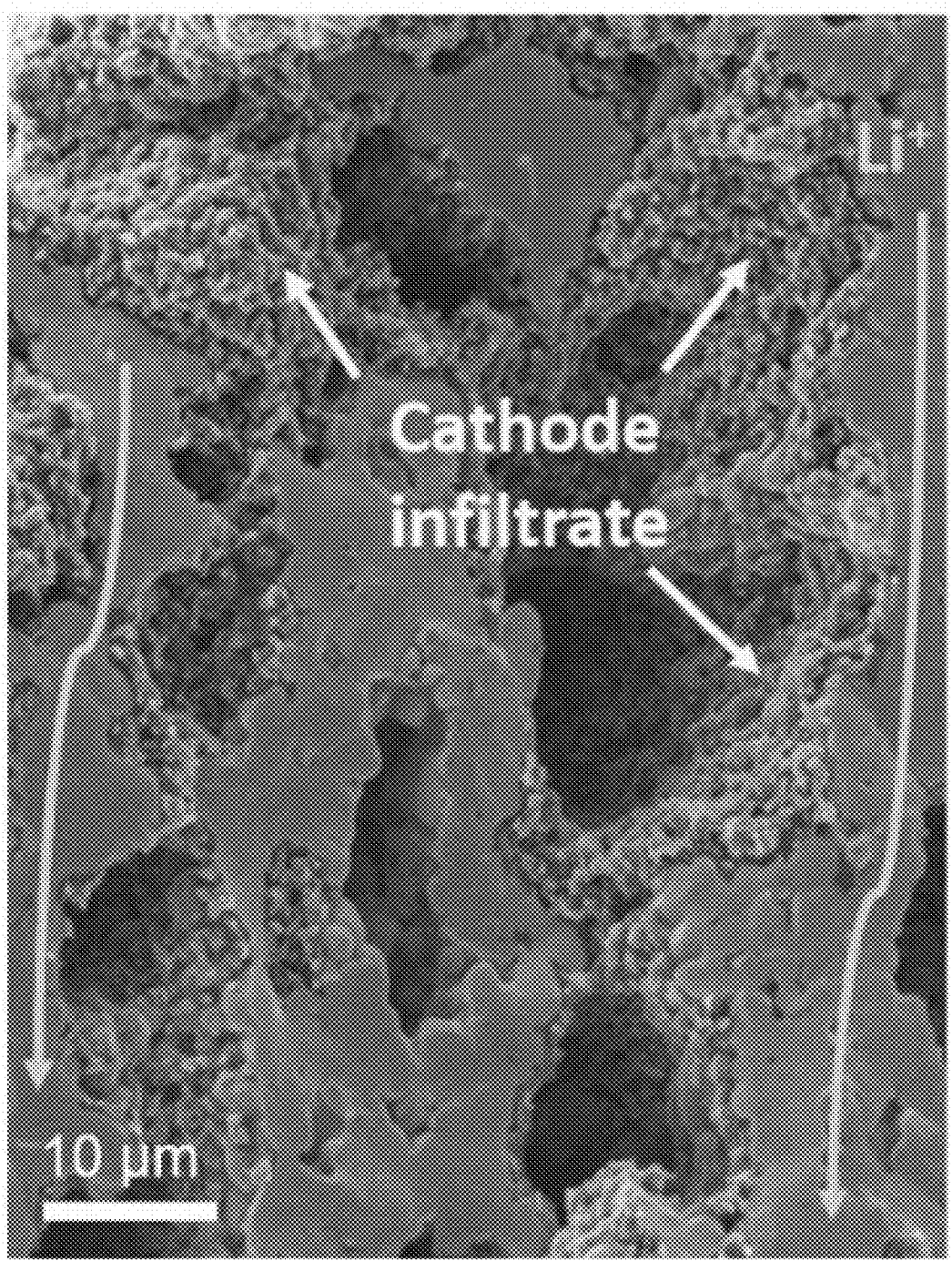
FIG. 4C shows an example of an SEM fracture surface image of the same cell at higher magnification showing cathode infiltrate.

For this work, ASSBs were constructed using a porous/dense bilayer framework. A slurry containing processed (ball-milled and heat-treated) NMC-622, carbon black, and PVdF binder was infiltrated into the porous layer, followed by solvent removal (FIG. 4A). Typical NMC-622 loadings were 4-5 mg cm$^{-2}$ with the potential to reach 35-40 mg cm$^{-2}$ on further optimization of the infiltration process. Note that these values are for the porous layer used in this study (130 µm thick, 70% porous) and can change with varying porosities and thicknesses of the porous layer. Fracture surface micrographs show that the cathode slurry penetrated into the porous LLZO layer (FIGS. 4B and 4C).

LiTFSI (4 mol. %)/LiBOB (1 mol. %)/succinonitrile (SCN) was then melt-infiltrated into the structure. The plastic-crystal electrolyte solidifies on cooling to room temperature and serves as an ionically conducting bridge between the NMC-622 and the LLZO framework. The waxy and soft nature of the plastic-crystal also helps to maintain contact among the components as the cell is cycled. In a similar manner, polymer-Li salt complexes (PEO-based) have been reported to electrochemically connect the cathode with sintered oxide solid electrolytes but with limitations on cathode selection (e.g., LiFePO$_4$) and operating temperature ($\geq$60° C.) because of the poor oxidative stability and conductivity of the PEO.

Figure 4D:
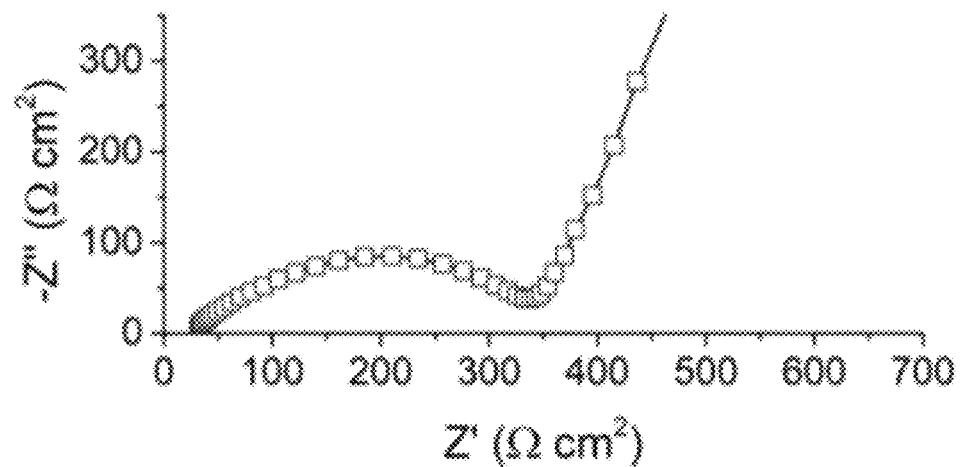
FIG. 4D an example of a Nyquist plot of the constructed ASSB.
Figure 4E:
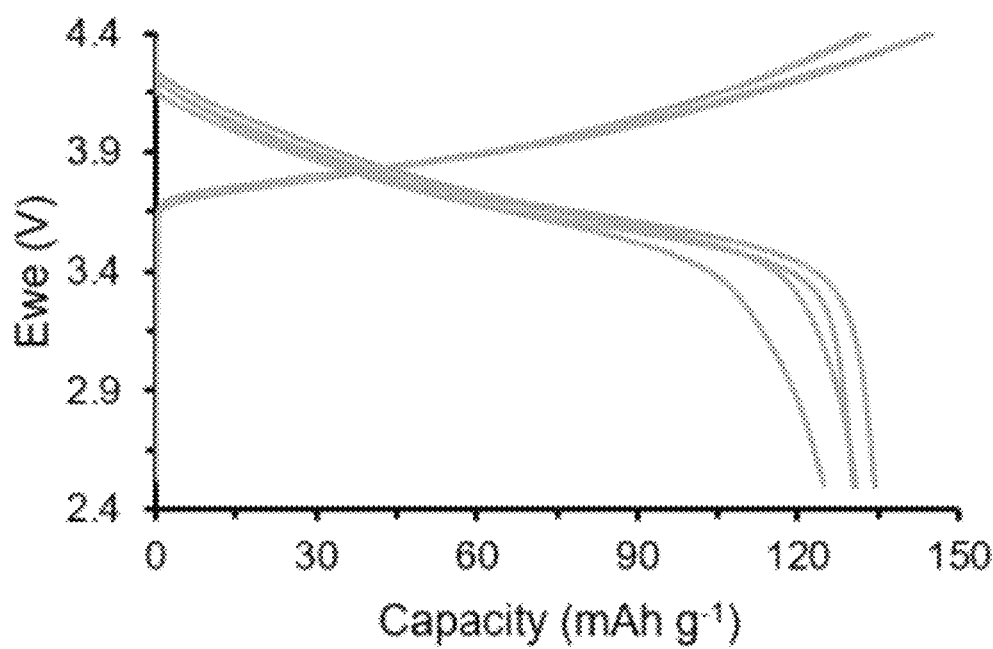
FIG. 4E shows example of initial charge/discharge profiles of the ASSB.

The constructed devices showed total room temperature impedances of ~350 $\Omega$ cm$^2$ (FIG. 4D), the lowest ever reported for liquid-free ASSBs using LLZO as the electrolyte. Considering that the impedances of the dense LLZO layer and Li/LLZO interfaces are low (FIG. 2A), the main contributor is the composite cathode, which is about 120-130 µm thick. Bilayer cells with no SCN based solid electrolyte infiltration showed total impedances of ~180 k$\Omega$ cm$^2$, demonstrating the crucial role of the mediator solid electrolyte.

The solid-state-cells were cycled between 2.5-4.4 V at 0.1 C (1 C=175 mAh g$^{-1}$) rate, and showed discharge capacities of 125-135 mAh g$^{-1}$. This is comparable to the capacity that is obtained upon cycling processed NMC-622 with liquid electrolyte. Although the structure of the bulk NMC-622 appeared unchanged after ball milling and heat-treatment, some degradation, particularly at particle surfaces, is known to occur, which accounts for the somewhat lower than expected capacity.

Rapid capacity fade within several cycles or much lower than expected capacities are typically reported for ASSBs in which the cathode material and oxide solid electrolyte are heat treated to ensure intimate contact. Absence of conductive additive, formation of electrochemically inactive interfaces or micro-cracking due to volume changes during cycling are the likely causes. The preliminary cycling results here are in contrast, in spite of the use of a thick cathode, 4-6 times thicker than usual.

Successful room temperature cycling of a bulk type ASSB using a LLZO separator and composite electrode in a practical form factor has been described above. The superior electrochemical performance of the ASSB constructed here can be ascribed to several factors, including the use of a thin, dense LLZO separator layer, seamless Li/LLZO contact, a low tortuosity pore structure, and intimate NMC-622/SCN/LLZO contact. In addition to the aforementioned advantages of this approach, the concept of combining a rigid scaffold with a soft, yet solid, conductor is general, and can be expanded to other types of solid electrolytes, including those that conduct, e.g., sodium.

Calculations show that ASSBs based on this concept can exceed the energy densities and specific energies of state-of-the-art LIBs by 1.8-2.6 times and 1.2-1.8 times, respectively, if thick electrodes with high porosities are used, the dense LLZO layer is 20 µm thick, and the lithium metal excess is limited to 20%. Future work will focus on optimizing components to maximize energy density and specific energy, including further tuning of the FTC process.

Example—Initial Charge/Discharge Profiles of All-Solid-State Batteries

Figure 12A:
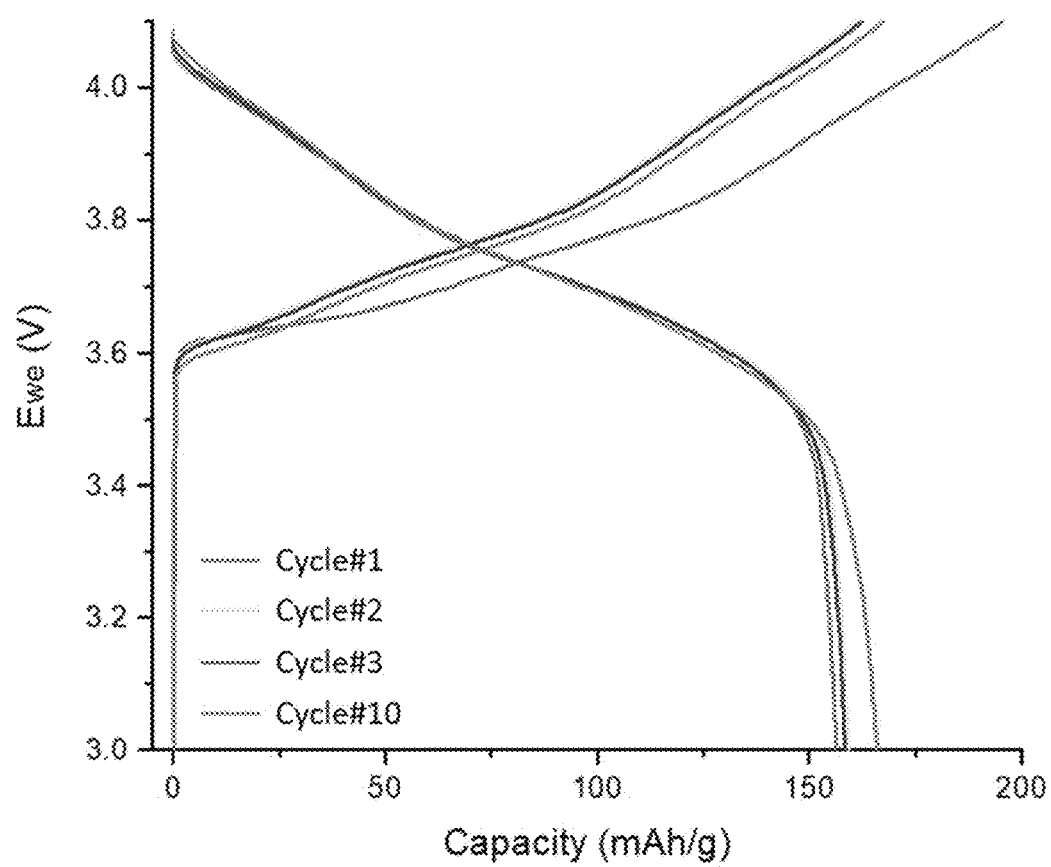
FIGS. 12A and 12B show examples of initial charge/discharge profiles of an all-solid-state battery.
Figure 12B:
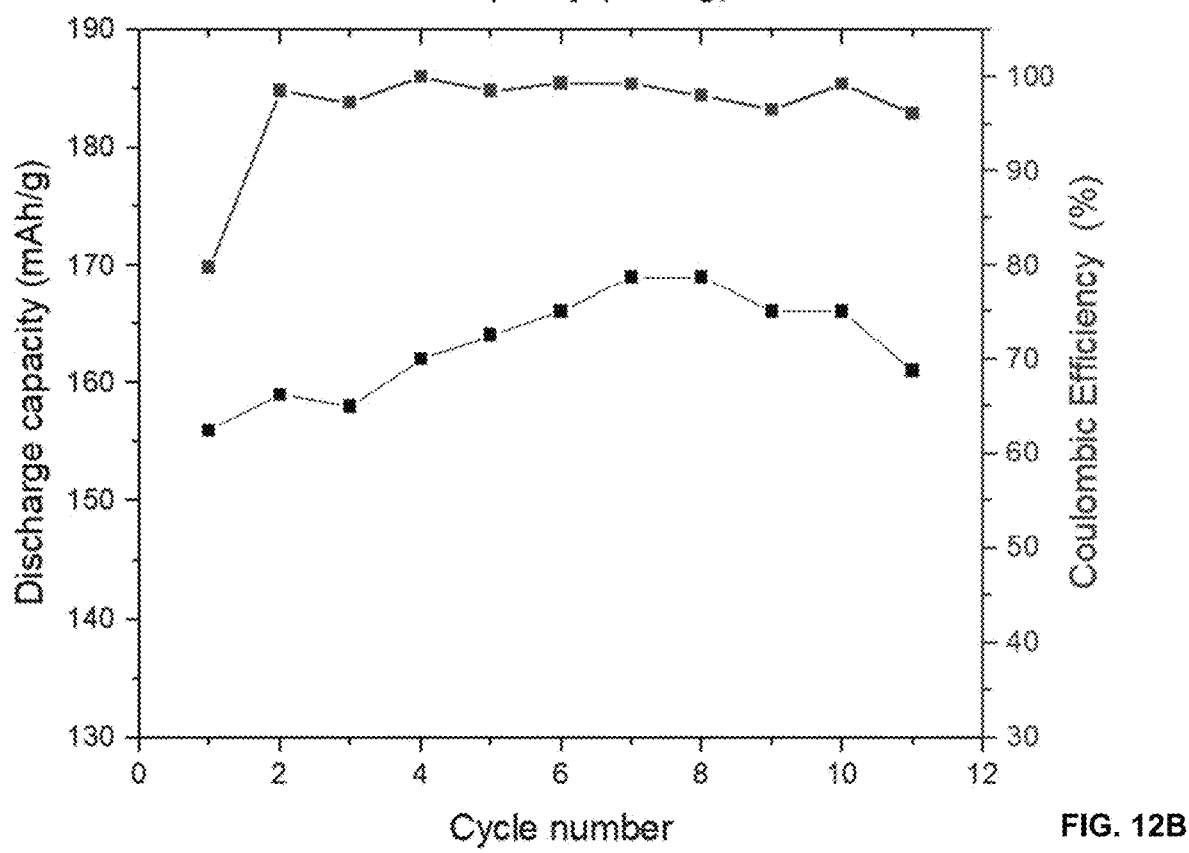

FIGS. 12A and 12B show examples of initial charge/discharge profiles of an all-solid-state battery. The all-solid-state battery used in these experiments had the configuration of an all-solid-state battery 800 shown in FIG. 8. The cathode was LiNi$_{0.8}$Mn$_{0.1}$Co$_{0.1}$O$_2$ cathode and the anode was lithium metal.

Figure 13A:
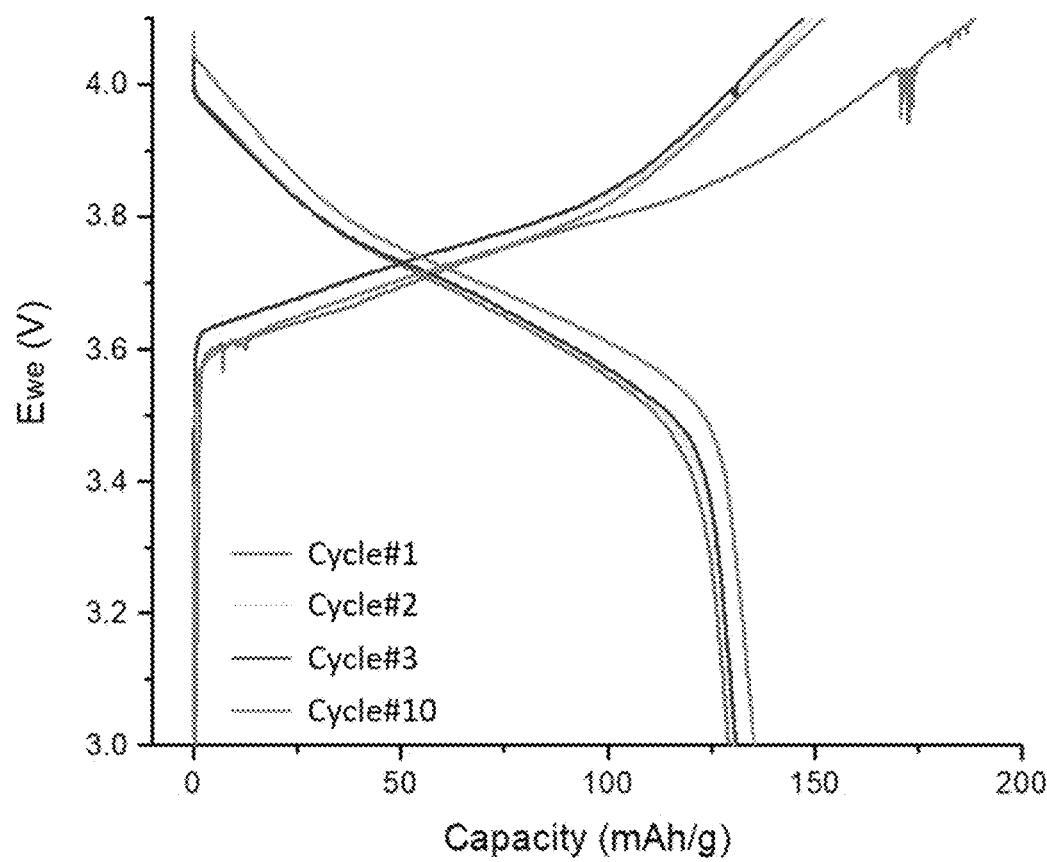
FIGS. 13A and 13B show examples of initial charge/discharge profiles of all-solid-state battery.
Figure 13B:
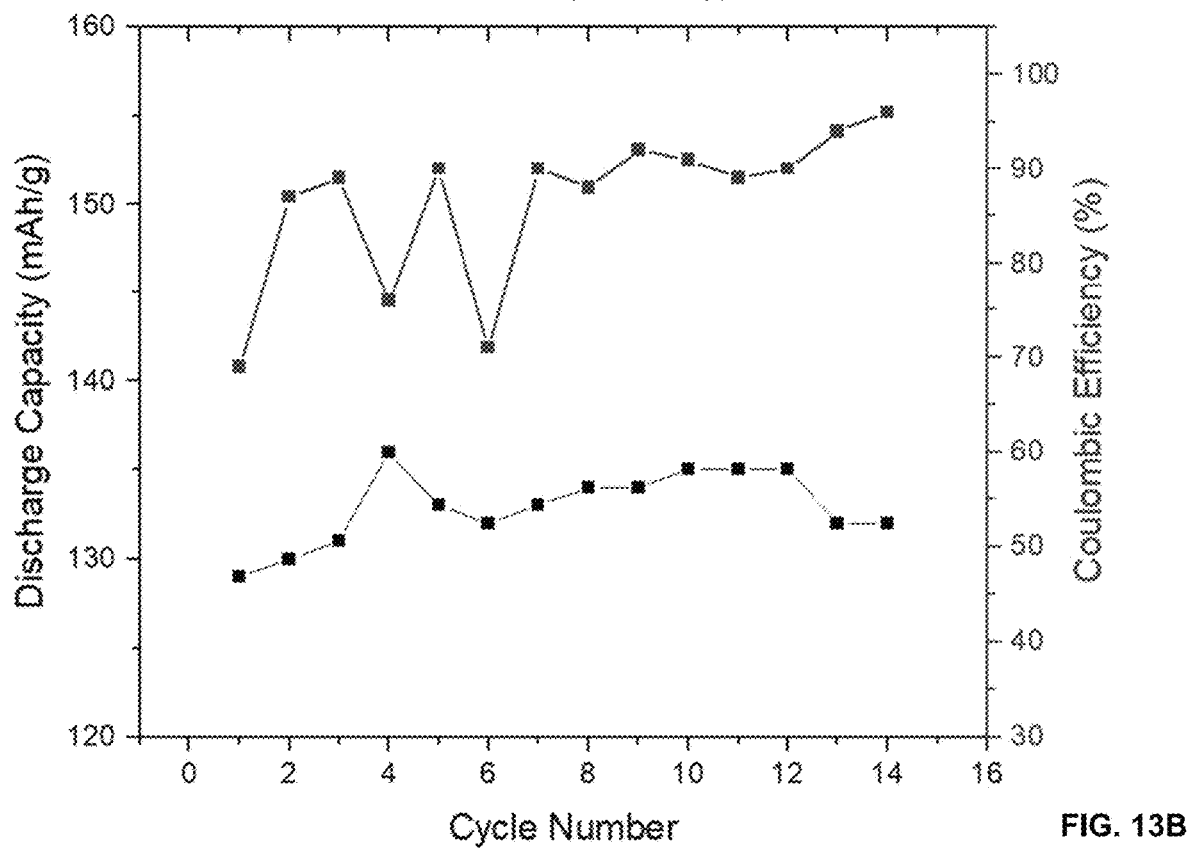

FIGS. 13A and 13B show examples of initial charge/discharge profiles of all-solid-state battery. The all-solid-state battery used in these experiments had the configuration of an all-solid-state battery 800 shown in FIG. 8. The cathode was LiNi$_{0.6}$Mn$_{0.2}$Co$_{0.2}$O$_2$ cathode and the anode was lithium metal.

Example—Tape Casting (TC) of LLZO

Commercial LLZO powder, Li$_2$CO$_3$, polyvinyl butyral, and benzyl butyl phthalate at selected weight ratios were added to a 30 ml Nalgene bottle. One fourth of the container was filled with 3.0 mm Y:ZrO$_2$ beads. Alcohol and acetone solvents were introduced and the mixture was ball-milled for 48 h to homogenize the suspension, then tape cast onto a Mylar sheet. After solvent evaporation, the green tape was peeled from Mylar and punched to 22 mm disks. Green tape thicknesses were controlled by either adjusting the gap height of the doctor blade, or by thermo-compressing multiple green tapes.

Example—Freeze Tape Casting (FTC) of LLZO

Commercial LLZO powder, Li$_2$CO$_3$, polyacrylic acid, and Xanthan gum at selected weight ratios were added to a 30 ml Nalgene bottle. One fourth of the container was filled with 3.0 mm Y:ZrO$_2$ beads. Deionized water was introduced as the solvent and the mixture was ball-milled for 3 h to homogenize the slurry. The slurry was then transferred to a Teflon beaker and two acrylic latex emulsion binders at selected wt. ratios were mixed in by magnetic stirring for 1 h. The slurry was cast onto a Mylar sheet using a doctor blade. The gap height was controlled to obtain target thicknesses. The cast slurry was slowly pulled over the freezing bed held at $-11$° C. using a commercial unit to obtain desired microstructures. Once the entire cast was frozen, samples were transferred to a freeze dryer to sublime the ice under vacuum.

Example—Sintering of the TC and FTC LLZO Green Tapes

TC LLZO green tapes were placed in between graphite foils, which were then placed in between Al$_2$O$_3$ disks for mechanical support. Graphite foils are used as non-reactive substrates. The entire stack was placed on an Al$_2$O$_3$ boat and loaded into a tube furnace. Samples were heated to target temperatures of 1070-1090° C. at 10° C. min$^{-1}$ and held for 1-2 h under Ar flow. Sintered samples were reheated to 840° C. at 10° C. min$^{-1}$ with 0 h dwell under zero grade airflow to remove carbon deposits.

For porous/dense and porous/dense/porous bi-/tri-layer sintering, FTC and TC green tapes were stacked and heated to 1090° C. at 5° C. min$^{-1}$ and then held for 3 h under Ar flow. Subsequent procedures were identical to sintering of TC green tapes as described above.

Example—Processing of Commercial NMC-622

LiNi$_{0.6}$Mn$_{0.2}$Co$_{0.2}$O$_2$ (NMC-622) was wet ball-milled in hexanes/ethanol (9/1 v/v) mixed solvent for 48 h using 2.0 mm Y:ZrO$_2$ milling media. Ball-milled powders were reheated to 750° C./20 h at 5° C. min$^{-1}$ under O$_2$ flow.

Example—Cell Assemblies

NMC (as-received or post-treated), carbon black, and polyvinylidene fluoride (PVDF), were mixed at a wt. ratio of 8:1:1 in N-methyl-2-pyrrolidinone (NMP) solvent using a centrifugal mixer. PVDF was pre-dissolved in NMP solvent to form a 6 wt. % solution. The slurry was cast onto a carbon coated Al foil and dried under vacuum at 80° C. for overnight. CR2032 coin cells were assembled in an argon-filled glovebox. Celgard 2325 separator, Li metal anode, and 1 M $LiPF_6$ in 1:1 v/v ethylene carbonate:diethyl carbonate liquid electrolyte were used for cell assembly.

Li foil was punched into 11 mm diameter disks. A sintered LLZO tape was sandwiched between two Li disks and heated to 250° C. for 10 min using a hot plate inside an argon-filled glovebox. The sintered LLZO used was either pristine or Au sputter coated. Sputter coated area was controlled to an 11 mm diameter circle using a deposition mask. Li/LLZO/Li symmetric arrays were placed in CR2032 coin cells for testing.

For the solid-state batteries, NMC:C:PVDF (8:1:1 w/w/w) dispersed in NMP was drop-cast onto the porous side of the sintered porous/dense bilayer. After drop casting, the bilayers were placed under vacuum to aid the infiltration process. NMP was removed by vacuum drying at 80° C. for overnight. The dense side of the bilayer was Au sputter coated and a Li disk was melt bonded onto it at 250° C. for 10 min. Lithium bis(trifluoromethanesulfonyl)imide (LiTFSI) and lithium bis(oxalato)borate (LiBOB) at 4 and 1 mol. % respectively were dissolved in succinonitrile (SCN) melted at 90° C. to form the SCN based solid electrolyte. The SCN-LiX (X=TFSI, BOB) electrolyte was melt-infiltrated to the cathode infiltrated porous layer by drop casting. On cooling, the SCN based electrolyte solidified. Completed cells were sealed in CR2032 coin-cells.

CONCLUSION

Further details regarding the embodiments described herein can be found in Eongyu Yi et al., "All-Solid-State Batteries Using Rationally Designed Garnet Electrolyte Frameworks", ACS Appl. Energy Mater. 2020, 3, 170-175, which is herein incorporated by reference.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A battery comprising:
   an anode layer;
   a separator portion comprising an ionically conducting oxide material disposed on the anode layer;
   a solid electrolyte portion comprising said ionically conducting oxide material and an ionically conducting solid material comprising a plastic-crystal comprising an organic compound and a lithium salt disposed on the separator, said ionically conducting oxide material being different than the ionically conducting solid material, said ionically conducting oxide material having pores having a tortuosity of about 1 and the ionically conducting solid material being disposed in said pores; and
   a cathode comprising lithium transition metal oxide particles disposed in the ionically conducting oxide material.

2. The battery of claim 1, wherein the anode layer comprises lithium or sodium.

3. The battery of claim 1, further comprising:
   a first current collector disposed on the solid electrolyte portion opposite the separator portion; and
   a second current collector disposed on the anode layer opposite the separator portion.

4. The battery of claim 1, wherein the lithium transition metal oxide particles are selected from a group consisting of $LiNi_xMn_yCo_zO_2$ ($0 \leq x \leq 1$, $0 \leq y \leq 1$, $0 \leq z \leq 1$, $x+y+z=1$), $LiMn_2O_4$ and variants, $LiMn_{1.5}Ni_{0.5}O_4$ and variants, and combinations thereof.

5. The battery of claim 1, wherein the solid electrolyte portion further comprises an electron conducting material disposed in the ionically conducting solid material or directly on the lithium transition metal oxide particles.

6. The battery of claim 5, wherein the electron conducting material is selected from a group consisting of carbon black particles, carbon nanotubes, carbon nanofibers, and a conductive polymer.

7. The battery of claim 1, wherein the solid electrolyte portion is about 50 μm to 500 μm thick.

8. The battery of claim 1, wherein the separator portion is about 5 μm to 40 μm thick.

9. The battery of claim 1, wherein a volume percent of the lithium transition metal oxide particles is about 50% to 80%.

10. The battery of claim 1, wherein the lithium salt is selected from a group consisting of lithium perchlorate ($LiClO_4$), lithium bis(trifluoromethanesulfonyl)imide (LiTFSI), lithium bis(fluorosulfonyl)imide (LiFSI), lithium difluoro(oxalate)borate (LiDFOB), lithium bis(oxalato)borate (LiBOB), lithium tetrafluoroborate ($LiBF_4$), lithium hexafluorophosphate ($LiPF_6$), and combinations thereof.

11. The battery of claim 1, wherein the organic compound is selected from a group consisting of alkylmethylpyrrolidinium imide, N-ethyl-N-methylpyrrolidinium tetrafluoroborate, N,N-dimethylethylenediamine, 2-methylimidazolium triflate, 2-methylimidazolinium triflate, N-ethyl-N-methylpyrrolidinium bis(fluorosulfonyl)amide, N-ethyl-N-methylpyrrolidinium bis(fluorosulfonyl)imide, succinonitrile, ethyl methylpyrrolidinium bis(trifluoromethanesulfonyl)amide, triisobutyl(methyl)phosphonium bis(fluorosulfonyl)imide, N,N-diethyl-N-methyl-N-(n-propyl) ammonium trifluoromethyltrifluoroborate, N,N'-diethyl-3-methylpyrazolium bis-(trifluoromethanesulfonyl)imide, pyrazolium imide, N-methyl-N-ethylpyrrolidinium bis(trifluoromethanesulfonyl)amide, and combinations thereof.

12. The battery of claim 1, wherein the ionically conducting oxide material comprises $Li_7La_3Zr_2O_{12}$ and derivatives.

13. The battery of claim 1, wherein the battery does not include a liquid.

* * * * *